US009671171B2

(12) United States Patent
Xiang

(10) Patent No.: US 9,671,171 B2
(45) Date of Patent: Jun. 6, 2017

(54) SYSTEMS AND METHODS OF THERMAL TRANSFER AND/OR STORAGE

(75) Inventor: XiaoDong Xiang, Danville, CA (US)

(73) Assignee: BLUELAGOON TECHNOLOGIES LTD., Saratoga, CA (US)

(*) Notice: Subject to any disclaimer, the term of this patent is extended or adjusted under 35 U.S.C. 154(b) by 825 days.

(21) Appl. No.: 12/916,539

(22) Filed: Oct. 31, 2010

(65) Prior Publication Data
US 2011/0162829 A1 Jul. 7, 2011

Related U.S. Application Data

(63) Continuation-in-part of application No. 12/885,411, filed on Sep. 17, 2010.
(Continued)

(51) Int. Cl.
F25D 11/00 (2006.01)
F25D 17/02 (2006.01)
(Continued)

(52) U.S. Cl.
CPC .............. F28D 15/02 (2013.01); C09K 5/063 (2013.01); C09K 5/10 (2013.01); F24H 7/02 (2013.01); F28C 3/005 (2013.01); F28D 20/0056 (2013.01); F28D 20/028 (2013.01); F24D 2220/10 (2013.01); F24J 2/32 (2013.01);
(Continued)

(58) Field of Classification Search
CPC ........... C09K 5/063; F24H 7/02; F28C 3/005; F28D 15/02; F28D 20/02; F28D 20/026; F28D 20/028; F28D 20/0056; F28D 2020/0047; F24D 2220/10; F24J 2/32; F28F 25/06; Y02E 60/142; Y02E 60/145

USPC ........ 62/434–437, 430; 165/10, 104.17, 234, 165/902
See application file for complete search history.

(56) References Cited

U.S. PATENT DOCUMENTS 4,159,289 A 6/1979 Anderson et al.
4,263,961 A * 4/1981 Morawetz et al. ........... 165/111
(Continued)

FOREIGN PATENT DOCUMENTS

WO WO/2011/035213 3/2011

OTHER PUBLICATIONS

PCT International Search Report and Written Opinion dated Jun. 28, 2011 issued in PCT/US2010/049406.
(Continued)

Primary Examiner — Ryan J Walters
Assistant Examiner — Joseph Trpisovsky
(74) Attorney, Agent, or Firm — Tom Hunter; Weaver Austin Villeneuve & Sampson LLP

(57) ABSTRACT

Systems, methods, and computer-implemented embodiments consistent with the inventions herein are directed to storing and/or transferring heat. In one exemplary implementation, there is provided a system for transferring/storing heat comprised of a heat exchange/storage apparatus including a chamber, and a heat input device adapted to heat/provide a vapor into the chamber. Other exemplary implementations may include one or more features consistent with a heat output device through which a working medium/fluid passes, a thermal storage medium located within the chamber, and/or a heat exchange system that delivers a heat exchange medium/fluid to the thermal storage medium.

30 Claims, 12 Drawing Sheets

Related U.S. Application Data

(60) Provisional application No. 61/276,885, filed on Sep. 17, 2009.

(51) Int. Cl.

| | | |
|---|---|---|
| *F28D 15/00* | (2006.01) | |
| *F28D 13/00* | (2006.01) | |
| *F28D 17/00* | (2006.01) | |
| *F28D 15/02* | (2006.01) | |
| *C09K 5/06* | (2006.01) | |
| *C09K 5/10* | (2006.01) | |
| *F24H 7/02* | (2006.01) | |
| *F28C 3/00* | (2006.01) | |
| *F28D 20/00* | (2006.01) | |
| *F28D 20/02* | (2006.01) | |
| *F24J 2/32* | (2006.01) | |
| *F28F 25/06* | (2006.01) | |

(52) U.S. Cl.
CPC .......... *F28D 2020/006* (2013.01); *F28D 2020/0021* (2013.01); *F28D 2020/0047* (2013.01); *F28F 25/06* (2013.01); *F28F 2265/14* (2013.01); *Y02E 60/142* (2013.01); *Y02E 60/145* (2013.01)

(56) References Cited

U.S. PATENT DOCUMENTS

| | | | |
|---|---|---|---|
| 4,458,669 A | | 7/1984 | Lee |
| 4,466,478 A | * | 8/1984 | Carlsson et al. ......... 165/104.17 |
| 4,509,344 A | | 4/1985 | Ludwigsen et al. |
| 4,535,837 A | * | 8/1985 | Ishii et al. ............... 165/104.17 |
| 4,696,338 A | * | 9/1987 | Jensen et al. ............ 165/104.17 |
| 4,708,849 A | * | 11/1987 | Mielnik et al. ................. 422/26 |
| 4,821,794 A | * | 4/1989 | Tsai et al. ............... 165/104.17 |
| 4,864,831 A | | 9/1989 | Hino |
| 4,894,077 A | | 1/1990 | Simon et al. |
| 5,038,850 A | * | 8/1991 | Choi .............................. 165/10 |
| 5,409,676 A | | 4/1995 | Nasako et al. |
| 5,658,324 A | | 8/1997 | Bailey, Sr. et al. |
| 6,059,016 A | | 5/2000 | Rafalovich et al. |
| 6,116,330 A | | 9/2000 | Salyer |
| 7,316,262 B1 | | 1/2008 | Rini et al. |
| 7,641,715 B2 | | 1/2010 | Py et al. |
| 8,171,984 B2 | | 5/2012 | Christ et al. |
| 2002/0108745 A1 | | 8/2002 | Kimura |
| 2008/0272331 A1 | | 11/2008 | Mohapatra et al. |
| 2009/0211249 A1 | | 8/2009 | Wohrer et al. |
| 2009/0250189 A1 | * | 10/2009 | Soukhojak et al. ............ 165/10 |
| 2011/0120673 A1 | * | 5/2011 | Xiang et al. ............. 165/104.25 |
| 2012/0241122 A1 | * | 9/2012 | Xiang et al. .................... 165/10 |

OTHER PUBLICATIONS

PCT International Preliminary Report on Patentability dated Mar. 20, 2012 issued in PCT/US2010/049406.

US Office Action dated Jan. 27, 2015 issued in U.S. Appl. No. 12/885,411.

US Final Office Action dated Sep. 18, 2015 issued in U.S. Appl. No. 12/885,411.

US Notice of Allowance dated Nov. 21, 2016 issued in U.S. Appl. No. 12/885,411.

* cited by examiner

SYSTEMS AND METHODS OF THERMAL TRANSFER AND/OR STORAGE

This application is a continuation-in part of U.S. application Ser. No. 12/885,411, filed Sep. 17, 2010, which claims priority to and benefit of U.S. provisional application No. 61/276,885, filed Sep. 17, 2009, all of which are incorporated herein by reference in their entirety for all purposes.

FIELD

Aspects of the innovations herein relate to heat exchange and/or thermal energy storage methods and apparatus. More specifically, exemplary innovations relate to the application of phase change materials (PCMs) as thermal energy storage materials and/or heat exchange media.

BACKGROUND INFORMATION

Energy storage is important in many energy consumption applications, including conventional and renewable utility power generation, building air-conditioning and heating, and industry process heating. For example, nuclear and coal-fired power plant need to shift their generated power during low demand hours to peak demand hours of the grid; wind power and solar power plants due to their intrinsically intermittent nature, need even more energy storage solution since their energy resources are more uncontrollable to meet the grid demand, which may introduce instability for the grid.

Direct electric energy storage requires batteries. Although there are continued efforts to improve battery technologies, their intrinsic high cost nature limits their applications to small scale emergency power supplies. Hydroelectric and compressed air solutions are two current applicable solutions, where electricity is first converted to potential energy of water or air by pumps and compressors, and then converted back to electricity when needed. However, these two solutions all require special geologic conditions, i.e. geologic conditions to build two low and high attitude water reservoirs or natural underground air-tight high pressure air-reservoir, which are rarely available in local power plants.

Thermal energy storage, however, is intrinsically low cost, due to availability of various low cost materials for the application. Since most of power plants (more than 80%) generate electricity through thermal process, thermal energy storage can be conveniently applied to utility power generation.

In the field of electricity generation, most power plants use Steam Turbines as driving engines for electricity generation. Steam Turbines work on the principle of the Rankine cycle, such as via turbine blades that are driven by expansion of overheated steam. The efficiency is determined by the pressure ratio of steam at entry and outlet. To increase the efficiency, the steam at the outlet needs to be condensed, most often by cooling water. In this process, large amount of latent heat, usually more than 60% of total thermal energy at entry is released from the low pressure steam at the outlet, e.g., dumped into cooling water and dissipated to the environment. For one ton of steam, this cooling process requires 50 to 100 tons of fresh water, which consume 5 to 10% of the electricity generated by turbine engine for the pumps to perform water circulation and 5 to 10 tons of water loss in water tower cooling process. If the water source is not free, the cost of electricity and water will consist 20-30% of total operating cost. As a result, power plants cannot be built at any location even if other environmental effects are not considered. Similar cooling process is also required for large scale refrigeration and desalination process. In these processes, water cooling operation cost also composed of large percentage of the total operating cost.

These are great needs to eliminate water cooling while maintaining the efficiency of electricity generation, refrigeration, and desalination from both environmental and economic grounds. In the past, air-cooling methods have been tried, however, not very successfully due to expensive equipment and the high electricity consumption involved.

Thermal energy storage is also important to concentrated solar power (CSP) plants. The working principle of CSP is to use various forms of focusing mirrors, such as parabolic dish mirrors, parabolic trough mirrors, Fresnel mirrors, and other types of focusing mirrors to focus the solar light onto the thermal collector, where special coating converts the solar radiation into thermal energy; thermal power heats up the heat transfer fluid (HTF) which flows through the thermal collector to a certain temperature, then generates high pressure high temperature steams via heat exchanger to drive the steam turbine for the electricity generation. In other words, CSP uses a solar boiler to replace a regular fossil fuel or nuclear fuel boilers, keeping other portions of conventional power plant unchanged.

However, the unstable nature of solar radiation, caused either by clouds or sunset, requires a thermal storage subsystem in CSP plants in order to qualify them as a base load power supplier. Therefore, a low cost and highly efficient thermal storage solution becomes a key for CSP plants to be deployed in large scale to replace fossil fuel power plants. For example, for a given parabolic trough CSP power plant, without thermal storage sub-system, its annual operation coefficient will be about 20%, i.e., 1760 operation hours per year; if a thermal storage sub-system is used, the operating coefficient can be increased to more than 60% or 5260 operation hours per year.

For thermal storage applications, there are three key thermal media: heat transfer fluid (HTF), thermal storage medium, and working medium. HTF transfers the heat from heat generator or collector to thermally charge storage medium or directly heat working medium through exchanger; storage media receive the heat from HTF and deliver the heat to the working medium through heat exchanger; and the working medium receives the heat from heat exchanger and drives the heat engine.

HTF can either be a gas or liquid. There are mainly two types of liquid HTF: one is heat conducting oil and the other molten salt. Normally, the highest temperature conducting oil can sustain is about 400° C. Above this temperature, the conducting oil will decompose. Molten salt, on the other hand, can sustain up to 600° C. temperature, however, has to be kept at higher than 220° C. all the time in order to avoid solidification and subsequent damage to the transport pipes and containers. This requirement normally causes higher system maintenance costs. For gas type HTF, steam can be used; however, its pressure and cost will be too high for high temperature steam applications; hot air can be used as gas type HTF; however, it has very low heat capacity and needs high electricity consumption to create high flow rate.

In most cases, the working medium is a liquid, such as water, which is pre-pressurized to a desired working pressure, then heated to the desired working temperature via a heat exchanger to undergo a liquid-gas phase transition. High pressure vapor at the heat engine entry will expand, and during the process, the potential energy of pressurized molecule transform to kinetic energy due to the high speed gained during the expansion. This kinetic energy is the driving force of the heat engine for the mechanical work and, finally, electricity generated. For example, for a typical 1 MW steam turbine, it requires 2.4 MPa pressure at 355° C. temperature to achieve highest efficiency. For a typical 100 MW steam turbine, the required steam pressure and temperature will be 10 to 12 MPa at 380 to 400° C. temperature range. Large size steam turbines can usually achieve higher conversion efficiency from thermal energy to electricity, but in order to achieve this, they also require steam of higher pressure and temperature.

Two techniques to store thermal energy based on the types of heat absorbed in materials include methods of sensible heat and methods of latent heat.

Sensible heat storage mechanisms may be based on the specific heat capacity of the storage medium, wherein the charging and discharging of thermal energy to and from the storage medium may be realized by increasing or decreasing the temperature of the materials: $Q=MC_p(T_2-T_1)=MC_p\Delta T$ (Eq. 1), Where Q is the sensible heat stored in, M the mass, $C_p$ specific heat capacity of the storage medium, $T_1$ and $T_2$ starting and ending temperatures, $\Delta T$ the temperature difference.

Sensible heat storage is the most common, simple, mature and widely used thermal storage method. It can be further classified into four different methods: liquid, solid, liquid and solid mixed, and pressurized vapor sensible heat storage.

Liquid-phase sensible heat thermal storage. Liquid phase sensible heat thermal storage devices normally use either direct or indirect heat exchange methods. Here, for example, CSP solar collecting field, such as parabolic trough or linear Fresnel mirrors, normally use conducting oil (mineral oil or synthetic oil) as its HTF while using molten salt as liquid phase sensible heat thermal storage material. Liquid-phase sensible thermal storage materials are most often used in so called "Active Thermal Energy Storage" system, where storage materials circulate through heat exchangers and collectors. In this way, one needs to use a heat exchanger to transfer thermal energy from conducting oil to molten salt to store the thermal energy. Therefore, this method is called indirect thermal storage. Currently, most distributed solar thermal collecting fields (such as parabolic dish, parabolic trough, and linear Fresnel CSP) use such methods, which are the only commercialized mature thermal energy storage method. Typically, two tanks are used, one for the high temperature molten salt and the other one for the low temperature molten salt. During thermal energy storage time, the high temperature conducting oil will heat up the low temperature molten salt when it flows from low temperature container to high temperature container via a heat exchanger to transfer thermal energy from high temperature conducting oil to molten salt, while the high temperature molten salt will be stored in the high temperature container. When solar energy is not available, the high temperature molten salt will flow into low temperature container via a heat exchanger to generate high temperature high pressure steam for continuous electricity generation. This process comes to an end when most of the high temperature molten salt flow out from the high temperature container.

There are several problems with this approach: a) it requires several high temperature specialty pumps that can handle high temperature and very corrosive molten salt between the two containers, conducting oil-molten salt heat exchanger and molten salt-steam generation heat exchanger; b) it requires specialty heat exchanger due to the natures of molten salt; c) the construction cost is still quite high: for example, for large scale deployment, the thermal storage device construction cost can be $40/kWh of heat.

The two container molten salt solution can also become a direct thermal energy storage sub-system for a parabolic trough or tower CSP system. In these cases, the molten salt acts both as HTF for the solar collecting field and liquid phase sensible heat thermal storage material, i.e., HTF and sensible heat thermal storage material become the same material, no extra heat exchanger is involved, therefore, called direct thermal energy storage. Obviously, this approach avoids a heat exchanger, which will reduce thermal energy loss during the process. It is suitable for parabolic trough system works at 400~500° temperature range. A main shortcoming with liquid-phase molten salt sensible heat thermal storage approach is that extra heating devices and energy are required to keep the molten salt temperature above 220°, which is common molten salt's melting point, in order to avoid damage to the transport piping system during its solidifying process. For a distributed solar collecting field, this will significantly increase the complexity and the cost for the transport pipe, both in their construction and in their maintenance and services.

Tower CSP system can normally use direct liquid phase sensible heat thermal energy storage solution, such as in Spain Solar Tres tower CSP power plant. Because the transport piping system is vertically installed in the CSP tower, the liquid molten, salt is easily discharged from the pipes so that the solidifying problem is not as severe as in the parabolic trough CSP system. In addition, since the working temperature of tower CSP is normally significantly higher than that of a parabolic trough CSP system, the sensible heat thermal storage approach is more suitable to the tower CSP than for the trough CSP. For proper liquid phase temperature range, normally a mixture of inorganic salts or a single phase compound is used in such application. For example, the Solar Two tower CSP at Nevada of US used 60% of sodium nitride and 40% of potassium nitride as a single phase compound; its melting point is 220°. Its working temperature range is 300~600°. The SEGS trough system that built at California desert of USA in the 1990s used therminol VP-1, Hitech (53% $KNO_3$+7% $NaNO_3$+40% $NaNO_2$ mixture) and Hitec XL (45% $KNO_3$+48% $Ca(NO_3)_2$+7% $NaNO_3$ mixture) as their direct liquid sensible heat thermal energy storage materials.

Solid state sensible heat thermal energy storage. Solid state sensible heat thermal energy storage uses rock, concrete, sand, etc. low cost solid state material as thermal storage media. Since the solid materials cannot be transported between containers for thermal energy transportation, a gas phase or liquid phase HTF also have to be used for heat exchange media between HTF, storage medium and working medium. This type of system also called "Passive Thermal Energy Storage" system. In direct steam generation CSP system, the thermal storage system normally uses solid state sensible heat thermal energy storage materials. The greatest advantage is low cost for storage materials. However, it can only be used in indirect thermal energy storage approach. Tamme from Germany Aero Space Center (DLR) studied and developed high temperature concrete and casting ceramic as solid state sensible heat thermal energy storage material based on the property study of sand-rock concrete and basalt concrete, where the frame for the high temperature concrete is ferric oxide, the cement acts as filling material. However, a disadvantage of solid state sensible storage method is that the heat exchange and working temperature decrease during discharge, since sensible heat thermal storage materials' temperature decreases as thermal energy decreases. Another problem is that the thermal conductivity and heat transfer coefficients are low. Also if direct generated steam is used for the HTF, as it currently is, that requires the transport piping system to cross the entire solar collecting field and the thermal storage containers to sustain high temperature and high pressure. This will dramatically increase the cost for such steam transport pipes as well as the thermal storage container cost. On the other hand, to reduce the cost, the pressure of the directly generated steam has to be lowered, which will decrease the working efficiency for steam turbine. As consequence, this approach has been researched for a long time without necessary breakthroughs.

Liquid-Solid Combined Sensible Heat Thermal Energy Storage.

Liquid-solid state combined sensible heat thermal energy storage approaches use some solid state materials and HTF that is compatible at high temperature so that the solid state material and the HTF can be combined together to increase the heat capacity for the combined thermal storage system. One of the obvious advantages of using solid state material in thermal storage is to significantly reduce the usage of HTF while keeping the total amount of thermal energy stored unchanged so that the thermal storage cost can be lowed (in general; the cost of solid state material is much lower than that of HTF. In order to reduce the equipment investment cost for the two tank liquid phase molten salt thermal energy storage system, James from Sandia National Libratory designed and tested a thermocline tank storage system with 2.3 MWh thermal storage capacity. The thermocline tank storage system utilizes thermocline layer formed due to natural temperature cline distribution based on the relationship between thermal storage material density and the temperature. This thermocline layer is formed when there is a temperature difference appears between the top (high temperature portion) and the bottom (the low temperature portion). This thermocline layer acts as an insulation layer so that the molten salt on its top can keep at higher temperature and the molten salt on its bottom can keep at lower temperature. During thermal energy storage period, the thermocline layer moves to upper direction. During thermal energy release period, the thermocline layer moves to lower direction. In this way, it can keep the output molten salt at a constant temperature. When the thermocline layer reaches the top of the tank or to the bottom of the tank, the temperature of the output molten salt will change dramatically. In order to maintain the temperature layer gradient, one needs to strictly control the amount of input and output molten salt, as well as properly arranges solid state filling material into layered structure, paired with floating inlet and ring-shell heat exchanger devices. Although this approach may reduce the thermal storage cost by 35% comparing with previously described liquid phase sensible heat thermal energy storage system, it still has the similar shortcomings mentioned before.

Pressurized Water (Steam) Thermal Energy Storage.

The CSP power plant of Planta Solar 10 at Seville of Spain uses pressurized steam at 285° C. with 4 MPa pressure to store the thermal energy. PS10 is the first tower CSP project in Spain. It needs high pressure container to store the pressured high temperature water directly flowed from heat source or collector through high pressure pipes. This thermal storage approach can only be used to smooth the solar radiation intensity fluctuations during the day, which can provide 1 hour of steam to the turbine generator. When the pressured high temperature water is released from the storage vassal, it undergoes liquid-gas phase transition as the pressure is slightly reduced. The high pressure steam can be used directly to drive steam turbine. Strictly speaking, the stored energy here is still sensible heat from high pressure water, not latent heat which only exists upon liquid-gas phase transition outside the storage tank. It is an effective method to provide balance load for steam turbine. However, due to high cost of pressurized vessels, this approach is very hard to be deployed in large scale.

Latent heat storage mechanism utilizes the heat associate with a materials' physical state change, such as liquid to gas, solid to liquid, solid crystalline phase to phase transition. Latent heat associated with the transition has much higher effective specific heat capacity within transition than that of sensible heat storage materials. Heat absorbed or released at the transition is described by: $Q=MC_p(eff)\delta T$ (Eq. 2), where M is the mass of the materials and $C_p(eff)$ the effective heat capacity within phase transition, $\delta T$ temperature difference within transition range.

However, liquid-gas phase change latent heat storage is difficult to use due to extremely large volume change at the phase change. Water, for instance, expands 1600 times when it vaporizes at 0.1 MPa pressure (one atmosphere). Therefore, it is not economical to utilize latent heat for thermal energy storage with liquid-gas phase transition, because a large container with very high pressure inside the storage container is required to accommodate the gas phase volume, resulting significantly reduced thermal energy storage density and difficult mechanical structure design for the thermal storage apparatus.

In Europe, 13 countries proposed a design of PCM storage system, referred to as the DISTOR project. In this project, direct generated steam or (high pressure water) is used as HTF, where graphite and PCM micro-encapsulated compound storage materials are used. Other methods with mixed PCMs have also been proposed. In such previous proposals, heat exchange between HTF/WF and storage materials are shell-piping heat exchanger, where HTF/WF flow in piping and PCMs surround piping inside the tank with solid filling materials to improve the thermal contact.

Although there are many studies on PCM thermal storage, there are still major difficulties of using solid-liquid phase change materials (PCM) as latent heat storage. The first is that PCM volume changes during phase transition. The volume change makes mechanical system design considerably difficult. The second is difficult to maintain good heat conduction between solid-liquid PCMs and HTF. Heat transfer between the storage medium, HTS and working medium has not been solved properly, as a result, no commercial application of latent heat storage method and apparatus have succeeded so far.

There is, therefore, a need to overcome the shortcomings of the current thermal energy transfer/storage method.

SUMMARY

Systems, methods, and computer-implemented embodiments consistent with the inventions herein are directed to transferring and/or storing heat.

In one exemplary implementation, there is provided a system for transferring/storing heat comprised of a heat exchange/storage apparatus including a chamber, a heat output device through which a working medium/fluid passes, a heat input device adapted to provide a vapor form of heat transfer fluid into the chamber, a thermal storage medium located within the chamber, and a heat exchange system that delivers a heat exchange medium/fluid to the thermal storage surfaces.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

DESCRIPTION OF THE DRAWINGS

The accompanying drawings, which constitute a part of this specification, illustrate various implementations and aspects of the present invention and, together with the description, explain the principles of the invention. In the drawings.

DETAILED DESCRIPTION

Figure 1:
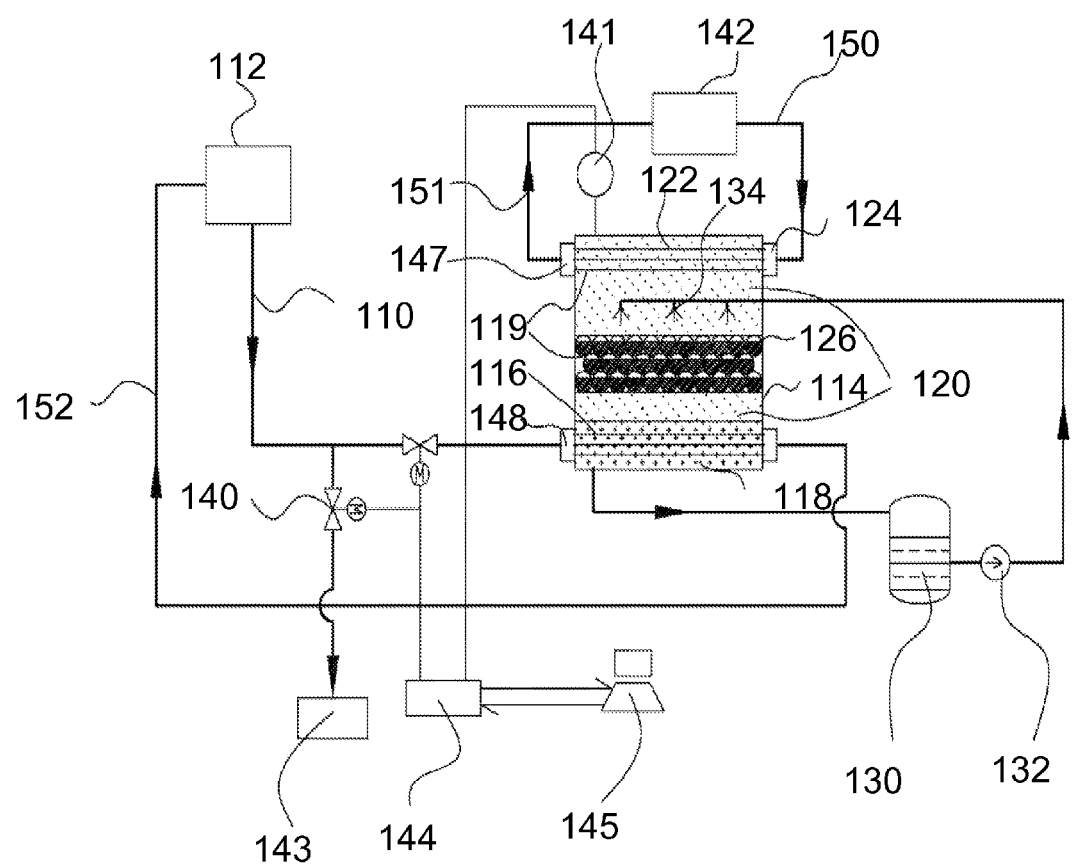
FIG. 1 is a block diagram of an exemplary system including a heat input device with tubing inside the chamber, a heat output device, PCM storage media and a heat exchange device, consistent with certain aspects related to the innovations herein.

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Aspects of the innovations, such as those set forth in some of the implementations below, may relate to systems and methods of integrating an evaporation-condensation heat exchange mechanism with a phase change latent heat energy storage apparatus, using liquid-gas phase change materials as heat exchange media and solid-liquid phase change materials as thermal energy storage media. However, it should be understood that the inventions herein are not limited to any such specific illustrations, but are defined by the scope of the claims and full disclosure.

According to some exemplary implementations, a PCM heat exchange and thermal storage apparatus may comprise the following components: a main container, an input heat transfer device which transports HTF and its heat into the container, an output heat transfer device which transports working medium and its thermal energy out of the container, at least one type solid-liquid PCM packaged inside secondary containers acting as thermal storage medium, a liquid-gas PCM, contained by the main container, acting as heat exchange medium between surfaces that confine the HTF, storage medium and working medium, a circulating system for liquid-gas PCM, and a pressure regulating system to control the vapor pressure of liquid-gas PCM.

A working medium absorbs most energy at its evaporation temperature. This is due to large amount of heat absorbed at liquid to gas phase transition or in the case of near critical point, where all liquid turns into gas phase regardless of the pressure. As the consequence, sensible heat storage medium has to provide all needed thermal energy at this temperature. In order to do this, sensible heat storage medium needed to be charged to a much higher temperature according to the Eq. 1. Since the thermal energy required for a given mass of working medium evaporates at its phase change temperature is about a few tens to a hundred times higher than the specific heat capacity of the sensible heat storage materials, $T_2$ has to be a few hundred degree higher than the phase transition temperature of the working medium, or the mass of sensible thermal storage materials and HTF flow rate have to be hundreds time higher than the mass and the flow rate of working medium, which will increase cost. This requirement presents many challenges to the sensible thermal storage system: (1) drastically increased heat loss in solar collecting field, including solar collector, transfer pipes and storage container due to thermal radiation and convection thermal loss at unnecessarily high temperature, and difficult to control to a tolerable level; (2) it requires the HTF work at this unnecessarily high temperature. Usually the tolerable working temperature of HTF limits the $T_2$ and in turn limits the working temperature of the working medium. Low working temperature of the working medium will result a low efficiency of the heat engine. Latent heat storage matches the heat demand of working medium near working temperature, lowers the required working temperature of HTF and solar collectors, therefore heat loss; and improves the efficiency of the heat engine.

To match the large thermal energy demand near the working (i.e, phase transition) temperature of the working medium, it is desirable to have a phase change material with transition temperature at or slightly above the working temperature as the thermal storage medium, which has a large latent heat absorbed or released at the phase transition to match demand. Furthermore, to provide storage medium of such large amount of heat, it is also desirable to have the HTF be a phase change materials (i.e. vapor-liquid phase change material, and transfer between heat source and heat storage/exchange apparatus as a vapor form carrying large latent heat and delivering upon condensation), as explained below, otherwise the HTF must have a very large flow rate (much larger than the flow rate of working medium) or a very high working temperature.

Liquids with large temperature span, such as water, synthetic oils, ionic fluids, etc., may be used as the HTF for thermal energy input. Working fluids (WFs), which may be water, though can also be ammonia, organic solutions, and many other choices of liquid with desired properties, are typically used for thermal energy output. Examples of such fluid are set forth in Table 1. Further, Solid-liquid phase PCM storage materials can be many choices of inorganic and organic PCM materials with desired transition temperature and effective heat capacity. Examples of such PCMs are set forth in Table 2 for low phase transition temperatures and Table 3 for high phase transition temperatures. Solid-liquid PCMs are usually packaged in secondary containers, in desired shapes and sizes, and positioned on layered shelves in the main container. Liquid-gas PCM heat exchange media can be many choices of liquids with desired liquid-gas phase transition and vapor pressure at the working temperature, and they may be the same materials as the HTFs or WFs, as set forth in Table 1.

Two main methods can be used to effectively transfer the thermal energy into the container, between the HTF, the storage medium and the WF, and out of the container.

According to exemplary implementations of a first method, a small amount liquid-gas PCM is positioned at the container bottom, in physical contact with input heat transfer device in "pool boiling" condition. Application of heat in the HTF via the input heat transfer device then quickly brings the liquid-gas PCM to evaporation state, transferring its latent heat energy into latent heat of a gas state of the liquid-gas PCM. In this case, the amount of liquid-gas PCM in the container is small so that it is easily to be heated up to desirable temperature, hence most of PCM is evaporated. The working temperature of the heat exchange container is determined by boiling point of liquid-gas PCM at a given pressure in the container. For example, using VP-1 synthetic oil as HTF, its boiling temperature at 0.1 MPa (or about one atmosphere pressure) is 257° C. If temperature increases to 320° C., its corresponding saturated vapor pressure is 0.36 MPa.

As soon as liquid-gas PCM vapor in contact with the surfaces of secondary containers of solid-liquid PCM storage medium and/or the output heat transfer device (with, e.g., a WF flowing inside), vapor phase of PCM condenses into liquid phase, transferring its latent heat at an extremely high rate (supper-exchange) to the storage medium and/or WF that brings the thermal energy out of heat exchanger. Almost all of the condensation latent heat energy is instantly transferred from "hot" surfaces to the "cold" surfaces, making a very effective heat exchange system. In the process of transfer latent heat into the solid state thermal storage materials or WF, the condensation liquid droplets falls back to the bottom of the container by gravity force to re-start the heat transfer cycle, so that the entire system becomes an extremely efficient heat exchanger and thermal storage system. Note, the storage materials here are not in direct contact with the heat input and output piping surface, as with existing systems and methods.

In a second exemplary method, the HTF and heat exchange media are the same liquid-gas PCM, in vapor form, which undergoes a slight reduction in pressure by passing through a throttling valve or other throttling device before entering the main container. When this vapor carrying the latent heat in physical contact with the surfaces of solid state and/or containers of solid-liquid phase change thermal storage materials, and WF via output heat transfer devices, the condensation process of the vapor transfers the latent heat of liquid-gas PCM vapor to thermal storage materials and/or WF.

In an exemplary implementation, a 400° C. VP-1 pressurized vapor may be introduced into chamber, with the vapor transferring its latent heat either to the working fluid via the heat transfer output device or to a solid-liquid PCM material via a condensation process, at e.g. 380° C.; further, condensed VP-1 can enter into a second container at 380° C. and flash evaporate at a lower temperature, for example flash into 280° C., with 30% becoming vapor state.

Turning back to the general system, in both cases, a circulating system may continuously supply a liquid PCM to the surface of secondary containers of the storage PCM, and transfer heat from the thermal storage material to the working fluid even if there is no input HTF flow.

To control temperature in the container for a given container size, implementations herein may control the pressure by changing the ratio of vapor to liquid volumes using inert gas and liquid PCM reservoir control systems. For any given liquid-gas PCM, its vapor pressure and temperature have one to one relationship in a closed container. For example, if one fills a quantity of water equal to 5/1600 of the total void volume, the ultimate pressure in the heat exchange/thermal storage container will be five atmospheres, or 0.5 MPa. The corresponding ultimate temperature (liquid-gas phase change transition temperature at 5 atmospheres) will be 150 degree Celsius. A inert gas/liquid-gas PCM reservoir and circulating pump system are used to assure right ratio and pressure for constant heat exchange.

The general principle of using gravity to circulate the evaporation and condensation process is commonly classified as two phase thermosiphons dates back to the steam age; this principle is widely used in one-dimensional thermosyphon device or heat pipe. The number of molecules (N in mole) that collide with unit surface area on condensing surface within unit time: $N=Z_m/N_a=P/(\sqrt{2RMT})$, Where $Z_m$ is collision rate, $N_a$ is Avogadro's number, P is PCM pressure, T is PCM temperature in Kelvin, R is atmospheric constant, M is mole weight in kg. For example, at 100 C (373K) and 1 atmosphere ($10^5$ pa) for water vapor molecules, N=5400 mole/sec $m^2$=0.54 mole/sec $cm^2$. If every water vapor molecule that collide with heat transfer surface condenses into liquid phase, latent heat released per second on each square centimeter is the Heat transfer rate=22 kJ/sec $cm^2$=22 kW/$cm^2$=220 MW/$m^2$. At 180° C. (453K) and 10 atmosphere (1 MPa), N=48452 mole/sec $m^2$=4.85 mole/sec $cm^2$, heat transfer rate=180 kW/cm² = 1800 MW/m². In fact, there is only a fraction of molecules that hit heat transfer surface is condensed into liquid phase, the above estimated heat transfer rate is an upper limit for the practical value.

The highest (World record) heat transfer rate for a heat pipe (which has the same working principle as a Thermosiphon) is 230 MW/m², a value that is on the same order as the innovations herein. With the second example, every 8 water molecules that hit the surface is condensed into liquid phase while transfer the latent heat into condensed surfaces. It should be noted that this heat transfer rate value is 4 times the heat flux of the radiation from the Sun at its surface.

Aspects of the present heat exchange innovations may have consistencies with a three-dimensional thermosiphon device, where evaporation-condensation latent heat exchange process simultaneously occurring between more than one surfaces of secondary containers or piping of different media within a 3-dimensional container. Effectively, inside heat exchange apparatus, the heat resistance is extremely small. Basically, heat conducting, rate between relatively lower and higher temperature surfaces of input and output heat transfer devices and storage materials is extremely high, reaching above the 100 MW/m² level, as illustrated previously. Therefore, this heat transfer process is also called a "thermal superconducting" process. Further, consistent with aspects of the innovations herein, additional liquid circulating system may be added to assist heat transfer between storage PCM and WF, e.g., when there is no heat input by HTF from the heat input device.

HTF temperature $T_1$, heat exchange medium temperature $T_2$, storage medium temperature $T_3$ and WF temperature $T_4$ have following relationship: $T_1 > T_2 > T_3 > T_4$, $\Delta T_{12} = T_1 - T_2$, $\Delta T_{23} = T_2 - T_3$, $\Delta T_{24} = T_2 - T_4$; $\Delta T_{12}$ and $\Delta T_{24}$ depend on flow rates of HTF and WF, physical structure of input and output heat transfer devices (mainly the heat transfer areas), thermal property of HTF and WF, and working pressure in the heat transfer container, which depends on the ratio of liquid to vapor volumes of liquid-gas PCM material in the heat exchange container. $\Delta T_{23}$ depends on the states of storage PCM materials within their secondary containers.

Phase change temperatures of the liquid-gas PCMs can be tuned by controlling the liquid-gas PCM vapor pressure in the heat exchange/thermal storage container. The main function of the PCM liquid is to keep the temperatures of all the solid state thermal storage material surfaces the same as WF heat transfer device surfaces via "super heat conducting" mechanism, i.e., evaporation-condensation process. Although the liquid-gas PCM also stores the energy, it is miner comparing with those of solid state thermal storage materials due to limited amount of liquid-gas PCM in the thermal storage container.

A series of this type of heat exchange/storage containers with different vaporization or heat exchange temperatures can then be stacked together with HTF and WF connecting pipes in weak thermal link between them.

Figure 13:
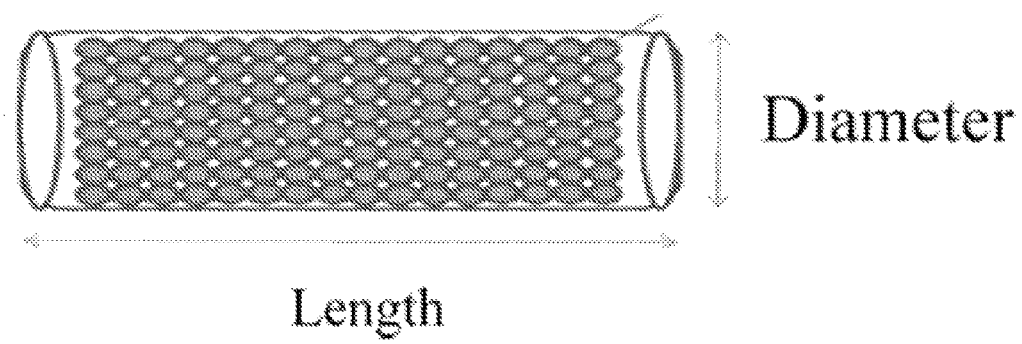
FIG. 13 illustrates an exemplary implementation of thermal storage container's geometric configurations with PCM filled inside of secondary cylindrical pipes, consistent with certain aspects related to the innovations herein.

Following is a relationship between the ratio of pressurized container material price versus PCM price: $\alpha = Pg/Pp = (4/R + 4/L) \cdot d \cdot K$ (Eq. 3), where $\alpha$ is the ratio, Pg is the container material (most of time, boiler steel) price, Pp is the PCM price, with Pg and Pp being price in weight; R is the radius of the cylindrical container, L is the length of the cylindrical container, d is the thickness of the cylindrical container wall, K is a special ratio that represent the unit price ratio of the container material versus PCM, it is in the range of 15 to 20 for many PCMs; This equation assumes that the thermal storage material's volume in the thermal storage container is about 50% of the total container volume. The wall thickness of the container should not exceed 3 cm in most cases. Therefore, we have the following simplified relationship: $\alpha = Pg/Pp = 0.15319 + 2.16/R$, (Eq. 4). FIG. 13 illustrates such a relationship. This is to say that the larger the container's diameter is, the less cost of the thermal storage container. However, this diameter is also limited by the industrial safety standard, where the pressurized container cannot be too large. Therefore, it is important to carefully choose the liquid-gas phase change heat exchange materials: the vapor pressure of the heat exchange materials at the working temperature in the thermal storage container should be close to 0.1 to 0.2 MPa. In most applications, the heat exchange pressure should be chosen not to be much higher than 1 MPa.

According to the heat transfer simulation based on the nature of PCM, such as the one we mentioned above, NaOH (73.2%)+NaCl (26.8%) mixture with latent heat of 370 kJ/kg, if this PCM mixture is packaged into a 5 cm diameter pipe (secondary container), within 5 hours, more than 80% PCM in the pipe will be melted when VP-1 vapor temperature is 10 degree higher than its melting point, 369° C. Therefore, an array of modular containers with secondary PCM cylindrical container size of 5 cm inside can be connected in parallel to form large enough capacity to supply sufficient thermal energy to meet power plant's need, since charging and discharging time scales are usually more than 5 hours.

In a different application, thermal exchange/storage method described above can be used to eliminate the need for cooling water in the Rankine cycle and other processes, such as refrigeration and desalination. If the residual heat at the outlet of a heat engine, or appliances, such as Rankine cycle, heat pumps, desalination and refrigeration apparatus, can be stored during operation hour, then dissipated or used latter time, great amount of energy and water resources will be saved. For example, in a Rankine cycle involves a steam turbine generator, low temperature steam, e.g. at 60° C. is coming out from the outlet of the turbine. For 1 ton of steam, there are about 650 kWh of latent heat needed to dissipate by cooling water. Instead of dissipation by cooling water, we can use low temperature PCM listed in Table 3 to store the latent heat using the method and system described above and below in this disclosure. First, the exhaust steam vapor as HTF enters the storage/heat exchange container, it will contact with solid-liquid PCM with proper transition temperature, in this case 30-50° C., the vapor will condense into water at the surface of PCM secondary container; as the PCM is charged up, the shutoff valve of this container will be closed, and vapor will be feed into other parallel connected similar containers. To use the heat stored in this container, water/vapor will then be evacuated before a different liquid-gas PCM heat exchange medium with low boiling temperature will be introduced into the container through showering/dripping system onto the surface of storage secondary containers, and to be evaporated into vapor. The vapor then will deliver its latent heat to heat output device and working medium to heat appliances or to container surface to be dissipated into environment. If a modular storage container only stores the thermal energy from turbine outlet for a fraction of operating time, and then re-use or dissipate it for a much longer time frame at rest of the day, deployment of an array of this type of storage apparatus will eliminate the need for cooling water. Since PCM effective heat capacity can be 100 times larger than water, a much small volume of storage containers are needed in this application. To condense 1 ton of steam vapor in 1 hour, one only needs 9.3 ton of Na2SO4*10H2O PCM storage materials, if storage filling ratio is 0.5, the storage chamber only needs 12 m³ volume.

Figure 9:
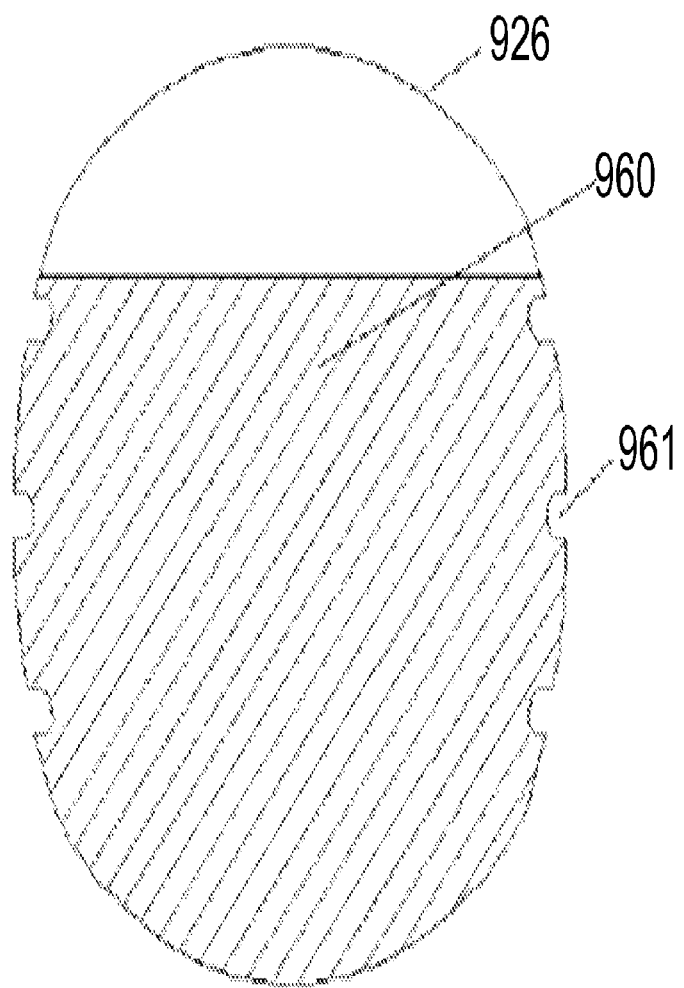
FIG. 9 is a schematic view of an exemplary solid-liquid PCM container design consistent with certain aspects related to the innovations herein.

FIG. 1 is a block diagram of an exemplary system, which includes a heat transfer fluid (HTF) 148, a PCM storage media 126 and a working fluid 147, and heat exchange medium 118, consistent with certain aspects related to the innovations herein. The illustrated system may include solid-liquid PCMs thermal energy storage features and a liquid-gas PCM heat exchange apparatus. Referring to FIG. 1, HTF vapor from a heat source or collector 112 carries latent heat flow through input heat transfer device 110 into the main container 114 via its surface 116 inside the container 114 and located at the container bottom. Solid-liquid PCM 126, contained in the secondary containers with certain shapes, with voids within as described in more detail in connection with FIG. 9, are used as main thermal energy storage materials in container 114. Input heat transfer device surface 116 is in physical contact with liquid-gas PCM 118. The volume of liquid state of PCM 118 is much smaller than the vapor form 120 of 118 which fills empty space volume in container 114, including void volume of solid materials 126 with a certain ratio. Liquid form of PCM 118 is designed to achieve thermal equilibrium quickly with HTF 116 to reach evaporating stage at the given pressure inside container 114. After HTF 116 vapor transfer its latent heat to 120 vapor, it condenses into liquid form and return to the heat source/collector to be reheated. Vapor 120 of Liquid-gas PCM 118 fills entire container upon evaporation. Upon in contact with cold surfaces of solid thermal storage material 126, the vapor 120 condenses instantly while transferring its latent heat to solid materials 126; condensed PCM liquid droplet 119 drips down to bottom of storage container 114 to start evaporation-condensation cycle again, until all thermal storage materials 126 in thermal equilibrium with storage container working temperature. Channels are designed to allow PCM vapor 120 traveling directly to storage container top. Upon liquid-gas PCM vapor 120 in contact with surfaces of output heat transfer device 122, it is condensed instantly while transferring latent heat from PCM vapor 120 to WF. Temperature of cold WF 124 may be raised to working temperature of storage container 114 due to extremely high heat transfer rate. This process of transfer heat from HTF to WF may be accomplished during or after charging of the storage device. When solar thermal collector field stops collecting thermal energy, due to cloudy weather or in the evening, stored thermal energy needs to be taken out from thermal storage container 114, a circulation pump 132, in fluid communication with a liquid-gas PCM reservoir 130 and bottom of the storage container 114, forces PCM liquid 118 to a liquid showering/dripping device 134 at top of thermal storage containers 126. PCM liquid 118 is spread onto high temperature surface of secondary containers of solid thermal storage material 126. PCM 118 is heated on the surfaces of secondary containers of solid materials 126 and becomes vaporized. The vapor releases latent heat to cold surface of WF 124 via same process as described previously. The condensed PCM 118 droplets 119 falls down from the container top, continue this dissemination, including a heat via contact, vaporization, and condensation process, until all the available thermal energy being used up in the thermal storage container.

Using a circulation pump to pump in or out PCM liquid 118 from a small reservoir 130 and pressure control system 141 including inert pressurized gas (not shown in Figure) also controls the ratio of vapor 120 volume versus liquid 118 volume of PCM so that ultimate pressure, monitored by pressure gauge in 141 and data acquisition/control unit 144 and computer 145, thus the working temperature in thermal storage container is easily controlled. In addition, this working temperature is readily tuned continuously, to desired levels.

The heat output device is part of a heat output system, which may also include the output tubing surfaces 222, the working medium/fluid itself 147, exit tubing 151 for the hot working medium/fluid, appliance 142, such as steam turbine, and return tubing 150 for the cooled working fluid circulating back into the chamber 114.

As indicated above, the heat exchange system 130/132/134 delivers a heat exchange medium/fluid to the thermal storage material 126 surfaces. According to implementations herein, the heat exchange medium/fluid may be one or more media/fluids selected from the list of materials set forth in Table 1. The heat exchange system may also include one or more storage tanks 130 as well as various pumps, valves and other flow control elements 132.

Figure 12:
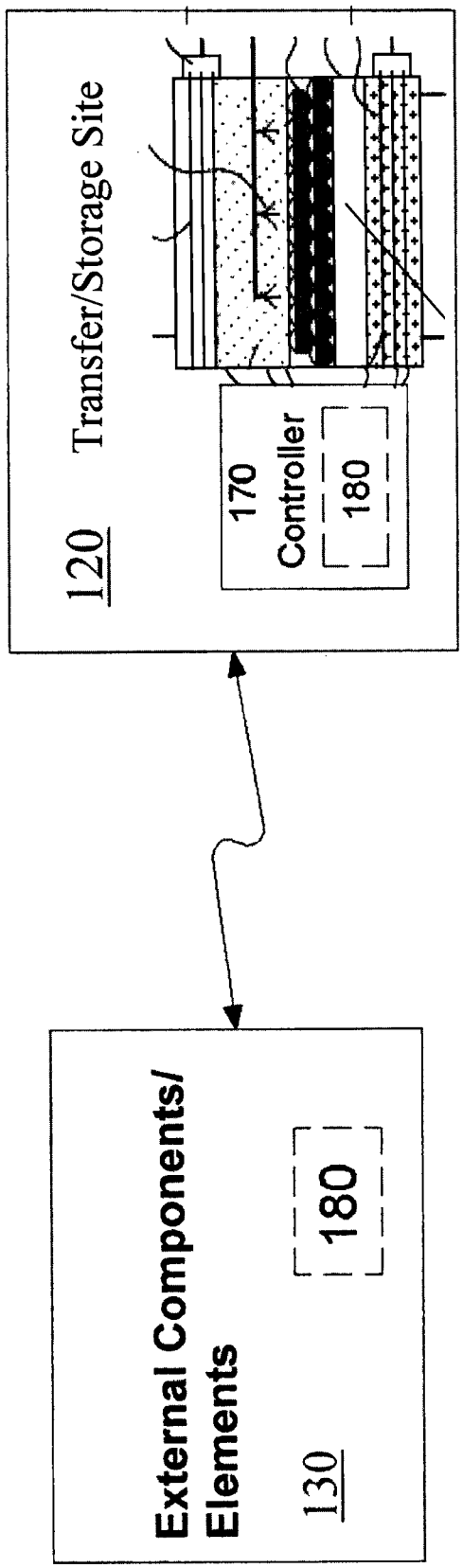
FIG. 12 is block diagram illustrating an exemplary thermal transfer/storage system in connection with associated computing/processing environments, consistent with certain aspects related to the innovations herein.

As set forth in more detail in association with FIG. 12, the system of FIG. 1 may also include computing/processing and control elements, such as pressure or temperature sensor in control system 141, data acquisition or processing components 144 and computer terminals, GUIs and other user interaction elements 145, among others.

The system of FIG. 1 may also include a variety of other valves and interconnections as set forth throughout this disclosure, including a valve 140 that serves to couple the heat transfer fluid system to adjacent/associated heat transfer systems, such as to a heat storage tank 143 in another such system.

Figure 2:
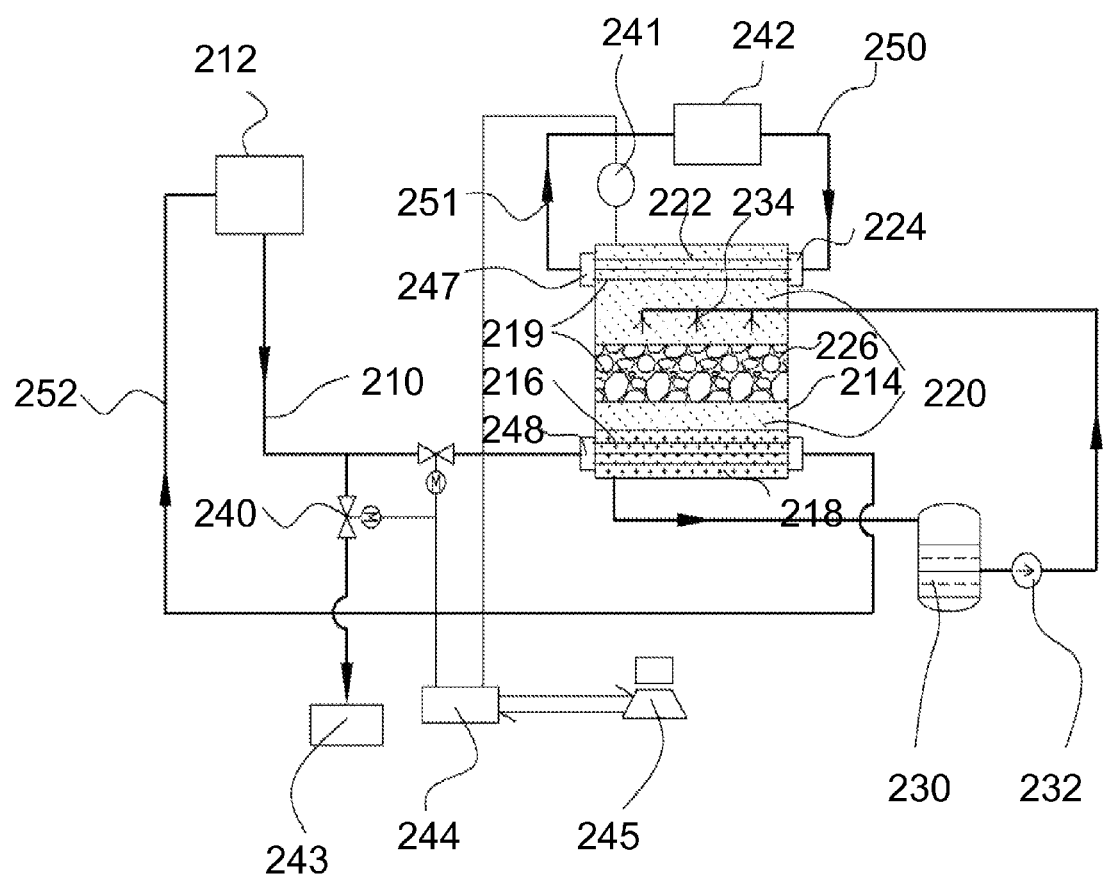
FIG. 2 is a block diagram of another exemplary system including a heat input device with tubing inside the chamber, a heat output device, sensible storage media and a heat exchange device, consistent with certain aspects related to the innovations herein.

FIG. 2 is a block diagram of an exemplary system including a heat input device, storage media, a heat output device, and a heat exchange system, consistent with certain aspects related to the innovations herein. Referring to FIG. 2, an exemplary system for transferring/storing heat may comprise a heat exchange/storage apparatus including a chamber 214, a heat input device 210 that carries a heat transfer fluid (HTF) from a heat source or collector 212 and carries thermal energy flow through input heat transfer device 210 into the main container 214 via its surface 216, which are inside and may be located generally toward the bottom of the chamber 214, a thermal storage medium 226 located within the chamber, a heat output device 222, and a heat exchange system 230/232/234 that delivers a heat exchange medium/fluid to the thermal storage medium 226. Input heat transfer device surface 216 is in physical contact with liquid form of liquid-gas PCM 218. The volume of liquid state of PCM 218 is much smaller than the vapor form 220 of 218 which fills empty space volume in container 214, including void volume of solid materials 226 with a certain ratio. Liquid form of PCM 218 is designed to achieve thermal equilibrium quickly with HTF 216 to reach evaporating stage at the given pressure in chamber 214. Liquid-gas PCM vapor 220 fills entire container upon evaporation. Upon in contact with cold surfaces of solid thermal storage material 226, the vapor condenses instantly while transferring latent heat to solid materials 226; condensed PCM liquid droplet 219 drips down to bottom of storage container 214 to start evaporation-condensation cycle again, until all thermal storage materials 226 in thermal equilibrium with storage container working temperature. The chamber may be designed with channels to allow PCM vapor 220 traveling directly to storage container top. Upon liquid-gas PCM vapor 220 in contact with surfaces of output heat transfer device 222, it is condensed instantly while transferring latent heat from PCM vapor 220 to the cold WF 224. As such, the temperature of the cold WF 224 may be raised to working temperature of storage container 214 quickly due to extremely high heat transfer rate. The heat output device includes heat output device surfaces 222 that pass through and are exposed within the chamber 214. This process of transfer heat from HTF to WF may be accomplished during or after charging of storage device.

The thermal storage medium 226 is located within the chamber 214 and has defined thermal storage surfaces. In the exemplary implementation of FIG. 2, the thermal storage medium 226 may include liquid, solid, liquid and solid mixed, or sensible heat storage, all within secondary containers. In case of solid sensible material, no secondary containers needed.

The heat output device is part of a heat output system, which may also include the output tubing surfaces 222, the working medium/fluid itself 247, exit tubing 251 for the hot working medium/fluid, a storage tank 242, and return tubing 250 for the cooled working fluid circulating back into the chamber 214.

As indicated above, the heat exchange system 230/232/234 delivers a heat exchange medium/fluid to the thermal storage material 226 surfaces. According to implementations herein, the heat exchange medium/fluid may be one or more media/fluids selected from the list of materials set forth in Table 1. The heat exchange system may also include one or more storage tanks 230 as well as various pumps, valves and other flow control elements 232.

As set forth in more detail in association with FIG. 12, the system of FIG. 2 may also include computing/processing and control elements, such as pressure or temperature sensor 241, data acquisition or processing components 244 and computer terminals, GUIs and other user interaction elements 245, among others.

The system of FIG. 2 may also include a variety of other valves and interconnections as set forth throughout this disclosure, including a valve 240 that serves to couple the heat transfer fluid System to adjacent/associated heat transfer systems, such as to a heat storage tank 243 in another such system.

Figure 3:
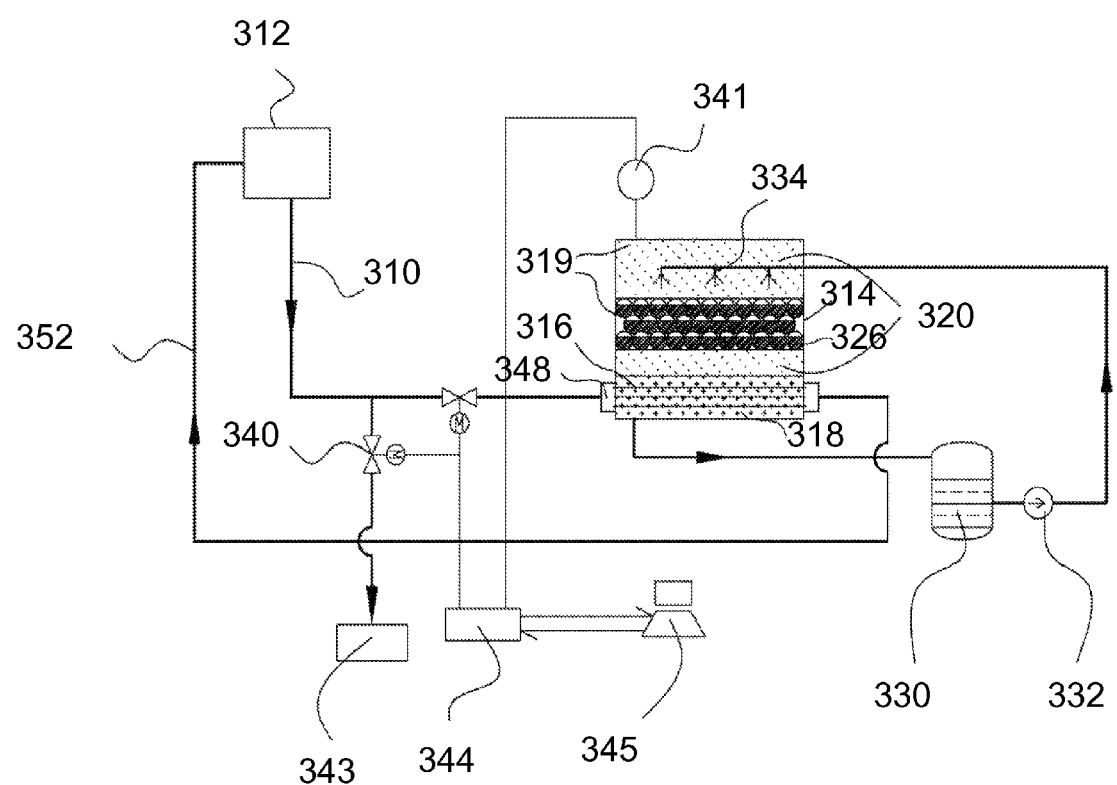
FIG. 3 is a block diagram of still another exemplary system including a heat input device with tubing inside the chamber, PCM storage media and a heat exchange device, consistent with certain aspects related to the innovations herein.

FIG. 3 is a block diagram of an exemplary system for discharging a low temperature residual latent heat from a heat appliances, such as steam turbine, refrigerator, or a desalination apparatus, which includes a exhaust vapor from heat appliances, PCM storage media, and a heat exchange medium distribution and recirculation system, consistent with certain aspects related to the innovations herein. The system of FIG. 3 differs from the system of FIGS. 1 and 2 in that there is no heat output device or working fluid, though heat may be dissipated into the environment via the chamber 314 surfaces. The illustrated system may include PCM (solid-liquid, etc.) thermal energy storage features and a PCM (liquid-gas, etc.) heat exchange apparatus. Referring to FIG. 3, exhaust vapor 348 from a heat appliances 312 carries low temperature latent energy flow through input heat transfer device 310 into the main container 314 via surfaces 316 inside the chamber 314 which may be located at the container bottom. Solid-liquid PCM 326, contained in secondary containers with specified shapes, with voids among them as described in more detail in connection with FIG. 9, are used as main thermal energy storage materials in container 314. Input heat transfer device surface 316 is in physical contact with heat exchange medium-liquid-gas PCM 318. The volume of liquid state of PCM 318 is much smaller than the vapor form 320 of the PCM 318 which fills empty space volume in container 314, including void volume of solid materials 326 with a certain ratio. Liquid form of PCM 318 is designed to achieve thermal equilibrium quickly with the HTF 316 to reach evaporating stage at the given chamber pressure, and at the same time condensing the exhaust vapor inside 316 into liquid, transferring latent heat from exhaust vapor to heat exchange medium vapor. The condensed vapor 348 as liquid returns back to the heat appliance 312. In operation, the liquid-gas PCM vapor 320 fills the entire container 314 upon evaporation. Upon contact with the lower-temperature surfaces of solid thermal storage material 326, the vapor condenses instantly while transferring latent heat to storage materials 326. Condensed PCM liquid droplets 319 then drip down to the bottom of storage container 314 to start evaporation-condensation cycle again, until all thermal storage materials 326 surface reach thermal equilibrium with heat exchange medium condensation temperature controlled by pressure control system 341/344/345.

Using a circulation pump to pump PCM liquid 318 in or out from a small reservoir 330 and pressure control system 341/344 may be used to control the ratio of vapor 320 volume versus liquid 318 volume of PCM so that both ultimate pressure, monitored by pressure gauge in 341 and data acquisition/control unit 344 and computer 345, and working temperature in the thermal storage container may be easily controlled in time sequence. In addition, the system may be configured such that this working temperature may be tuned continuously to a desired temperature or range. Again, as the storage materials 326 is charged full, the input entry for the exhaust vapor may be closed, and the circulating pump 332, small reservoir of 330 and showerhead device 334 may be used to release the stored thermal energy in the thermal storage materials within the secondary storage materials containers so that the stored thermal energy can be dissipated through the container 314 surfaces via thermal communication with the environment. During this time, the exhaust vapor can be channeled to one or more different storage systems 343. In this configuration, the system serves as an exhaust vapor condensation system, eliminating the need for water/air circulation cooling system.

Figure 4:
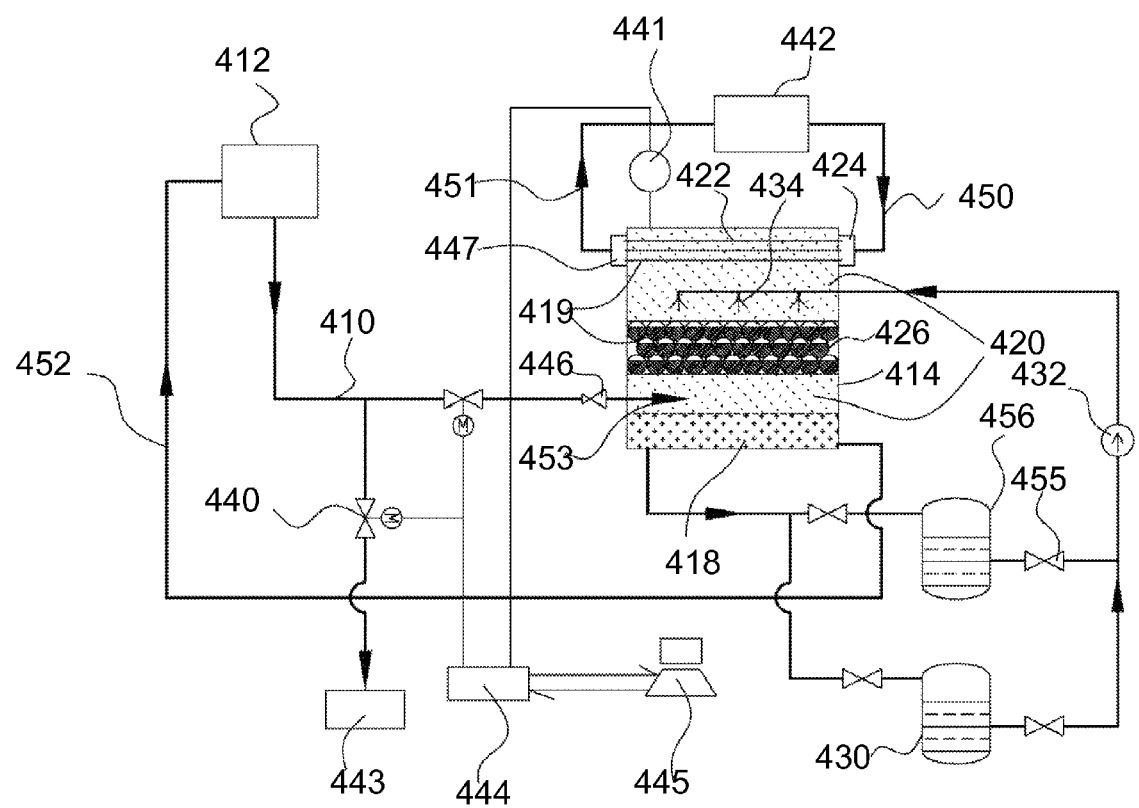
FIG. 4 is a block diagram of yet another exemplary system including a heat input device with injection nozzle, a heat output device, PCM storage media and a heat exchange device, consistent with certain aspects related to the innovations herein.

FIG. 4 is a block diagram of an exemplary system including a heat input device, PCM storage media, a heat output device, and a heat exchange system, consistent with certain aspects related to the innovations herein. Referring to FIG. 4, an exemplary system for transferring/storing heat may comprise a heat exchange/storage apparatus including a chamber 414, a heat input device 410/446 that carries a vapor form of the heat transfer fluid (HTF) from a heat source or solar collector 412 and injects the vapor into the chamber, a thermal storage medium 426 is located within the chamber, a heat output device, and a heat exchange system 456/455/434/432 that delivers a heat exchange medium/fluid to the thermal storage medium 426. In operation, the heat input device 453 injects a vapor form 420 of the heat transfer fluid 418 through a valve 446, etc. into the chamber. The vapor form 420 of the HTF may contact surfaces of the thermal storage medium 426 and condense thereon, delivering latent heat from the vapor form to the thermal storage medium via phase change from vapor 420 to liquid 418, which returns to heat source/collector 412. The heat output device includes heat output device surfaces 422 that pass through and are exposed within the chamber 414, and the vapor form of the HTF may also contact these output device surfaces to condense thereon and deliver heat. The heat transfer fluid that is condensed into liquid form is recirculated 452 out of the chamber back to the heat source or solar collector 412. This process of transfer heat from HTF to WF may be accomplished during or after charging of storage device.

The thermal storage medium 426 is located within the chamber 414 and has defined thermal storage surfaces, such as is explained in more detail in connection with FIG. 9. In the exemplary implementation of FIG. 4, the thermal storage medium 426 may include one or more phase change material (s) as set forth in Tables 2 and/or 3.

The heat output device is part of a heat output system, which may also include the output surfaces 422, the working medium/fluid itself 447, exit tubing 451 for the hot working medium/fluid, a heat appliance (such as turbine) 442, and return tubing 450 for the cooled working fluid circulating back into the chamber 414.

As indicated above, the heat exchange system 456/455/434 delivers a heat exchange medium/fluid to the thermal storage material 426 surfaces. According to implementations herein, the heat exchange medium/fluid may be one or more media/fluids selected from the list of materials set forth in Table 1. The heat exchange system may also include one or more storage tanks 456, 430 as well as various valves 455 and other flow control elements 432. In some implementations, e.g., to use the heat stored in the chamber 414, the HTF vapor may be evacuated prior to a different liquid-gas PCM heat exchange medium associated with a second storage tank 430 being introduced into the container through the showerhead 434 onto the surface of storage secondary containers 426, and to be evaporated into vapor. This vapor then will deliver its latent heat to heat output device and working medium.

As set forth in more detail in association with FIG. 12, the system 400 may also include computing/processing and control elements, such as data acquisition or processing components 444 and computer terminals, GUIs and other user interaction elements 445, among others.

The system 400 may also include a variety of other valves and interconnections as set forth throughout this disclosure, including a valve 440 that serves to couple the heat transfer fluid system to adjacent/associated heat transfer systems, such as to a heat storage tank 443 in another such system.

Figure 5:
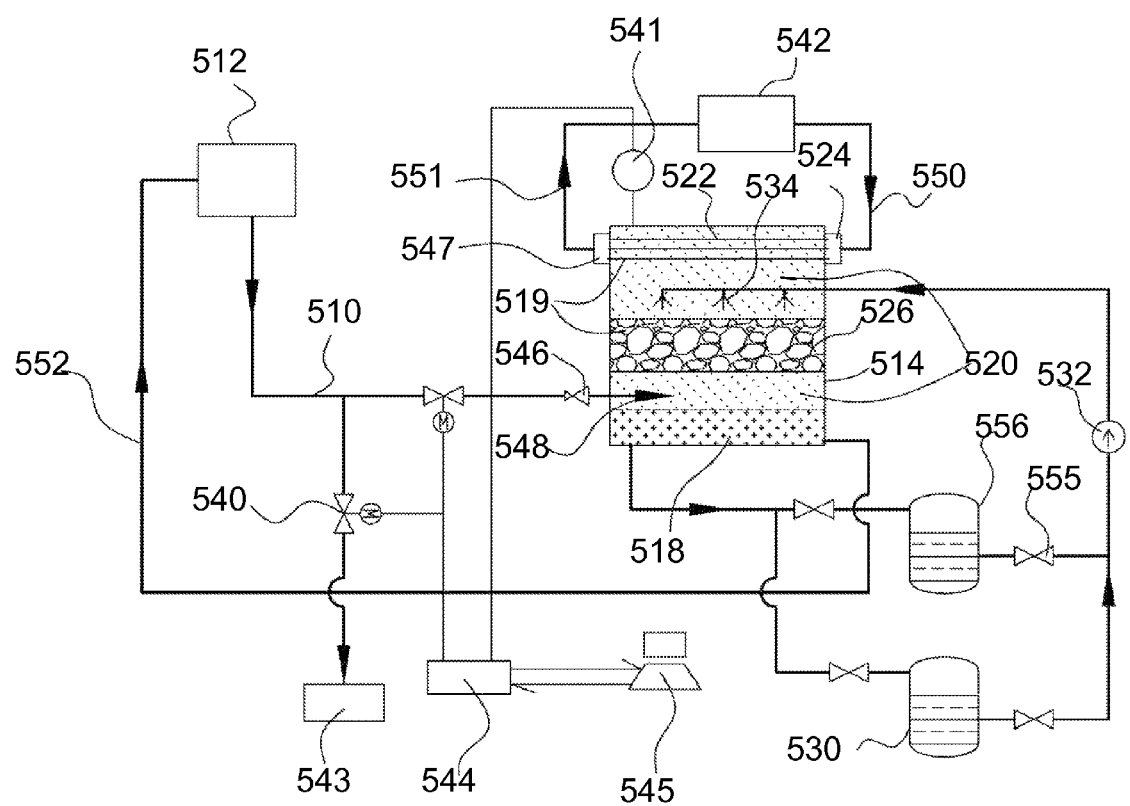
FIG. 5 is a block diagram of a further exemplary system including a heat input device with injection nozzle, a heat output device, sensible storage media and a heat exchange device, consistent with certain aspects related to the innovations herein.

FIG. 5 is a block diagram of an exemplary system including a heat input device, thermal storage media, a heat output device, and a heat exchange system, consistent with certain aspects related to the innovations herein. Referring to FIG. 5, an exemplary system for transferring/storing heat may comprise a heat exchange/storage apparatus including a chamber 514, a heat input device 510/546 that carries a heat transfer fluid (HTF) from a heat source or solar collector 512 and injects 548 a vapor form of the heat transfer fluid 520 through a valve device 546 into the chamber, a thermal storage medium 526 located within the chamber, a heat output device, and a heat exchange system 556/555/534 that delivers a heat exchange medium/fluid to the thermal storage medium 526. In operation, the heat input device injects the vapor form 520 of the heat transfer fluid 518 through a nozzle, throttle or valve 548, etc. into the chamber. The vapor form of the HTF may contact surfaces of the thermal storage medium 526 and condense thereon, delivering latent heat from the vapor form to the thermal storage medium via phase change from vapor to liquid. The heat output device includes heat output device surfaces 522 that pass through and are exposed within the chamber 514, and the vapor form of the HTF may also contact these output device surfaces to condense thereon and deliver heat. The heat transfer fluid that is condensed into liquid form is recirculated 552 out of the chamber back to the heat source or solar collector 512.

The thermal storage medium 526 is located within the chamber 514 and has defined thermal storage surfaces. In the exemplary implementation of FIG. 5, the thermal storage medium 526 may include liquid, solid, liquid and solid mixed, and/or sensible heat storage material with or without secondary containers.

The heat output device is part of a heat output system, which may also include the output surfaces 522, the working medium/fluid itself 547, exit tubing 551 for the hot working medium/fluid, a heat appliance (such as a turbine) 542, and return tubing 550 for the cooled working fluid circulating back into the chamber 514.

As indicated above, the heat exchange system 556/555/534 delivers a heat exchange medium/fluid to the thermal storage material 526 surfaces. According to implementations herein, the heat exchange medium/fluid may be one or more media/fluids selected from the list of materials set forth in Table 1. The heat exchange system may also include one or more storage tanks 556, 530 as well as various valves 555 and other flow control elements 532. In some implementations, e.g., to use the heat stored in the chamber 514, the HTF vapor may be evacuated prior to a different liquid-gas PCM heat exchange medium associated with a second storage tank 530 being introduced into the container through the showerhead 534 onto the surface of storage secondary containers 526, and to be evaporated into vapor. This vapor then will deliver its latent heat to heat output device and working medium and/or to chamber 514 surfaces to be dissipated to the environment.

As set forth in more detail in association with FIG. 12, the system of FIG. 5 may also include computing/processing and control elements, such as data acquisition or processing components 544 and computer terminals, GUIs and other user interaction elements 545, among others.

The system of FIG. 5 may also include a variety of other valves and interconnections as set forth throughout this disclosure, including a valve 540 that serves to couple the heat transfer fluid system to adjacent/associated heat transfer systems, such as to a heat storage tank 543 in another such system.

Figure 6:
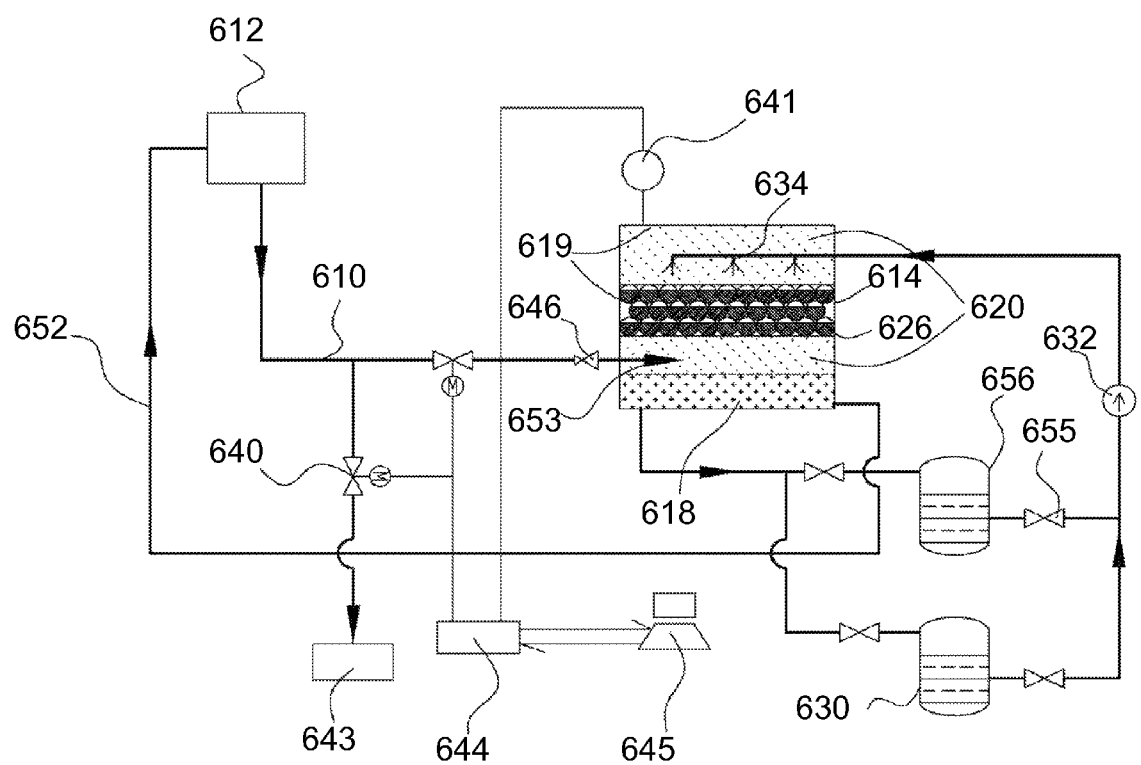
FIG. 6 is a block diagram of still a further exemplary system including a heat input device with injection nozzle, PCM storage media and a heat exchange device, consistent with certain aspects related to the innovations herein.

FIG. 6 is a block diagram of an exemplary system for discharging a low temperature residual latent heat vapor from a heat appliance, such as steam turbine, refrigerator, or a desalination apparatus, which includes a exhaust vapor from heat appliance, PCM storage media, and a heat exchange medium distribution and recirculation system 632/634/655/656, consistent with certain aspects related to the innovations herein. The system of FIG. 6 differs from the system of FIGS. 4 and 5 in that there is no heat output device or working fluid, though thermal energy may be dissipated into the environment via the container 614 surfaces. The illustrated system may include PCM (solid-liquid, etc.) thermal energy storage features and a PCM (liquid-gas, etc.) heat exchange medium and apparatus.

Referring to FIG. 6, exhaust vapor 620 from a heat appliance 612 carries low temperature latent energy flow through input heat transfer device 610, injects the vapor form 620 through a valve device 653 into the main container 614. The vapor form 620 may contact surfaces of the thermal storage medium 626 and the surfaces of the thermal storage chamber 614, and condense thereon, delivering latent heat from the vapor form to the environment via thermal communication between the chamber 614 surfaces or to the thermal storage medium, via phase change from vapor 620 to liquid 618. Solid-liquid PCM 626, contained in secondary containers with specified shapes and surface, with voids among them as described in more detail in connection with FIG. 9, are used as main thermal energy storage materials in container 614. In the exemplary implementation of FIG. 6, the thermal storage medium 626 may include one or more phase change material(s) as set forth in Tables 2 and/or 3.

The volume of liquid state of PCM 618 is much smaller than the vapor form 620 which fills empty space volume in container 614, including void volume of solid materials 626 with a certain ratio. In operation, the vapor form 620 fills the entire container 614 upon contact with the lower-temperature surfaces of solid thermal storage material 626 and the non-insulated container 614 surfaces, the vapor 620 condenses instantly into liquid while transferring latent heat to storage materials 626, or dissipated into environment via thermal communication between the surfaces of chamber 614 and the environment. Condensed PCM liquid droplets 619 then drip down to the bottom of storage container 614 to be transferred out of chamber via tubing 652 back to the heat appliance until all thermal storage materials 626 surface reach thermal equilibrium with input vapor 620. The heat exchange medium condensation temperature controlled by pressure control system 641/644/645.

The system may be configured such that the working temperature may be tuned continuously to a desired temperature or range. Again, as the thermal storage materials 626 is charged in full, the input entry for the exhaust vapor may be closed, and the circulating pump 632, small reservoir of 656 and showerhead device 634 may be used to release the stored thermal energy in the thermal storage materials within the secondary storage material containers so that the stored thermal energy can be dissipated through the container 614 surfaces via thermal communication with the environment. During this time, the exhaust vapor can be channeled to one or more different storage system 644. In this configuration, the system serves as an exhaust vapor condensation system, eliminating the need for water/air circulation cooling system.

Figure 7:
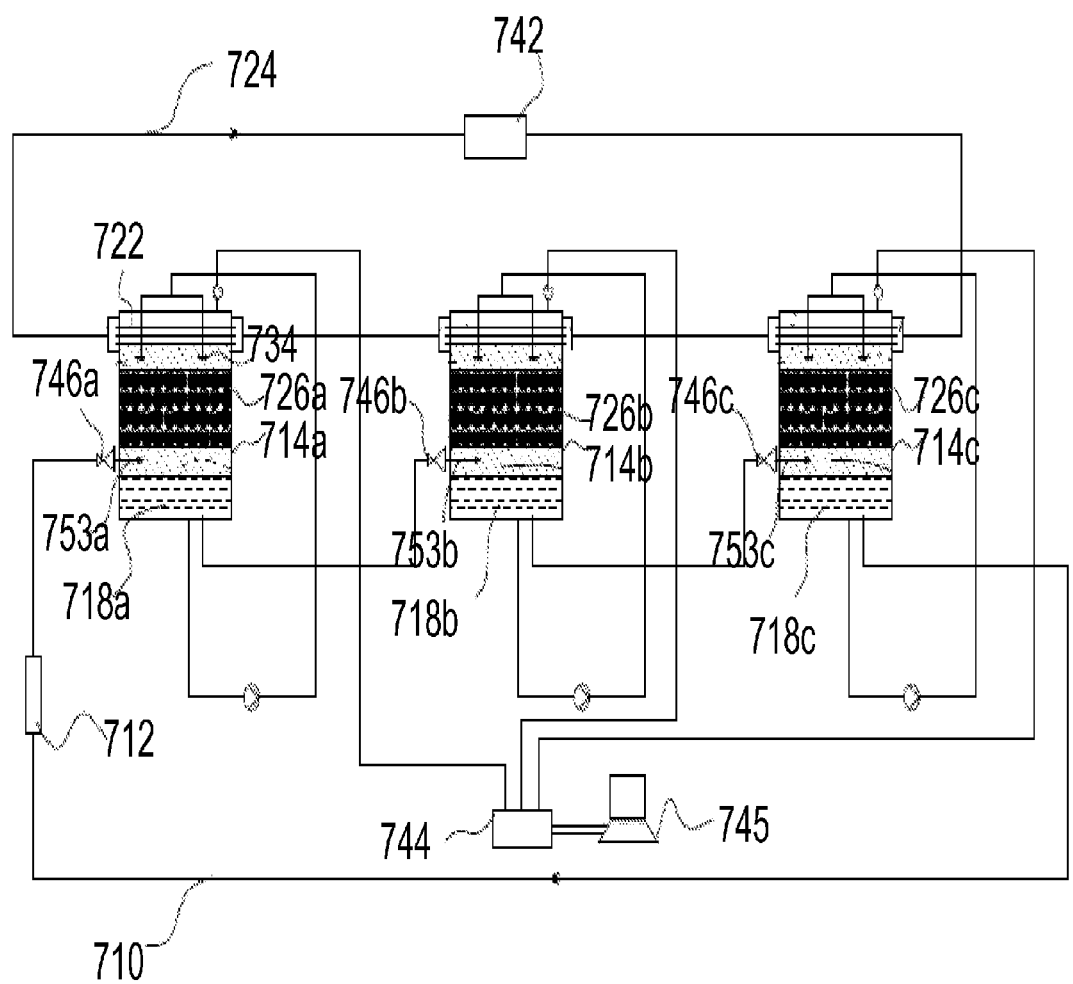
FIG. 7 is a block diagram of an exemplary system comprising a plurality of cascaded heat transfer/storage subsystems, consistent with certain aspects related to the innovations herein.

The implementations herein may also easily cascade into several subsystems connected together in series, as illustrated in FIG. 7. FIG. 7 is a block diagram of an exemplary system comprising a plurality of cascaded heat transfer/storage subsystems, consistent with certain aspects related to the innovations herein. Referring to FIG. 7, a cascaded heat transfer/storage system may comprise a plurality of chambers 714a, 714b, 714c, with each chamber here depicting a nozzle 746a, 746b, 746c for injecting a vapor form of the heat transfer fluid 753a, 753b, 753c into the respective chamber, thermal storage material 726a, 726b, 726c, and condensed heat transfer fluid 718a, 718b, 718c that may be circulated through a series of chambers including circulation via pipes 710 back to a heat source or solar collector 712, or recirculated back to the chamber via a showerhead 734. In one exemplary implementation, a working fluid 722 may be circulated through a plurality of chambers in series via pipes 724 and a reservoir 742. As set forth in more detail in association with FIG. 12, the system of FIG. 7 may also include computing/processing and control elements, such as data acquisition or processing components 744 and computer terminals, GUIs and other user interaction elements 745, among others.

Accordingly, as a result of the innovations herein, one or more of the following features may be achieved: 1) innovations that greatly improve heat exchanger design configurations; 2) easy transfer of thermal energy to and from thermal storage containers/solid thermal storage materials, enabling innovative and efficient utilization of solid thermal storage materials, achieving reduced cost of thermal storage; 3) greatly improvements in heat exchange efficiencies of thermal storage containers; 4) improved features of utilizing the solid to liquid phase change latent heat via packaging of PCMs; and/or 5) vapor input process methods that carries latent heat thermal energy, which also enables control of the working pressure and temperature in the thermal storage container.

Figure 8:
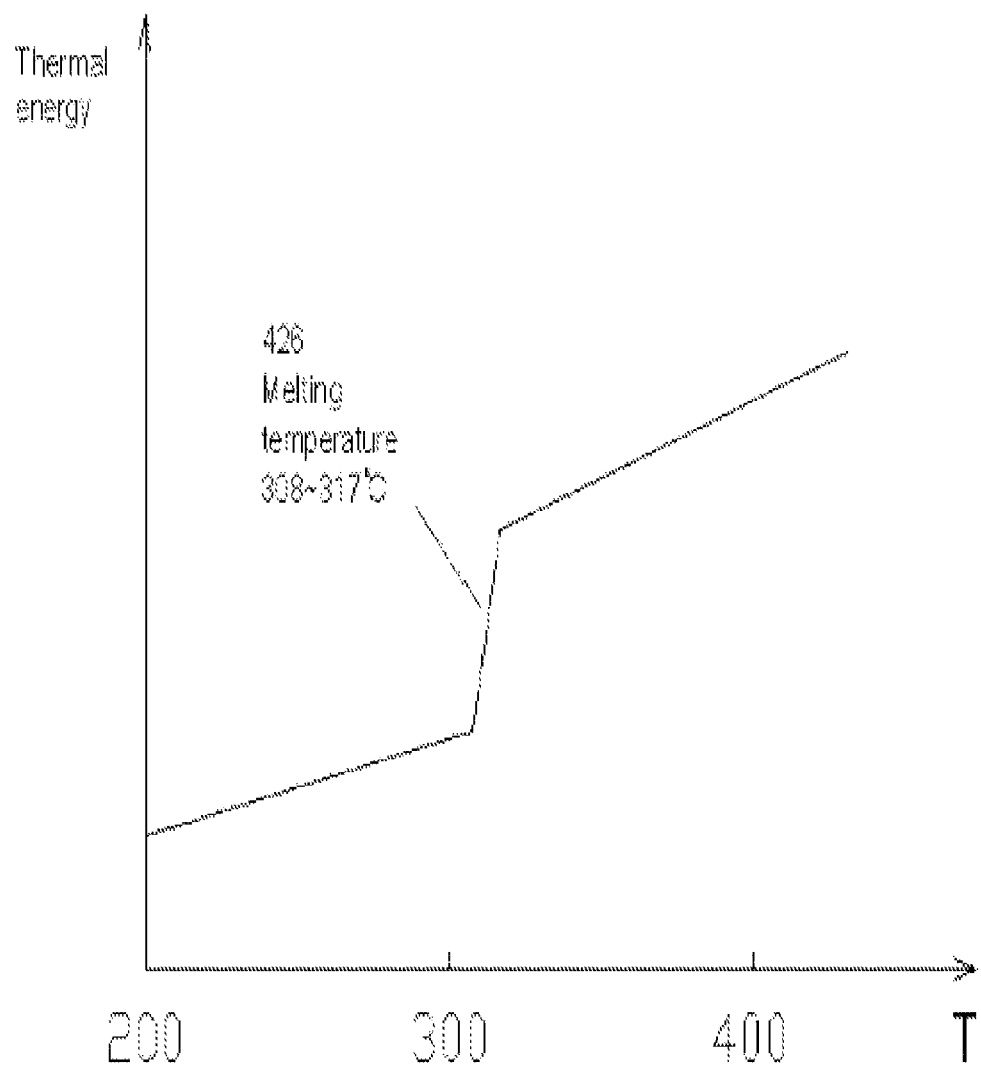
FIG. 8 is a graph illustrating an exemplary relationship of thermal energy versus PCM temperature, showing latent heat at solid-liquid phase transition, consistent with certain aspects related to the innovations herein.

FIG. 8 illustrates an exemplary thermal energy versus temperature diagram for solid-liquid PCMs 126. Phase change transition temperature for this PCM are 308° C. Below and above phase transition temperature, thermal energy versus temperature slops is shallow, indicating sensible-heat region. At phase transition temperature, thermal energy versus temperature slops is extremely steep, indicating latent heat region. Normally, thermal energy density and effective heat capacity at phase transition region is one to two orders of magnitude higher than that of sensible-heat region. Thermal energy storage density at a given temperature range is greatly increased.

This property is especially important for concentration solar thermal applications. For any given concentration solar thermal collecting field, there is an upper limit for the highest temperature this solar field can achieve. For example, for a synthetic oil based trough system, due to upper temperature limit of the synthetic oil, the highest temperature this solar field can reach is 400° C. For a thermal storage system with highest stored temperature at 400° C., the higher the temperature and pressure steam it generated, the higher thermal to electricity conversion efficiency it can achieve, the cost of the electricity can be lowered. For example, with current thermal storage design, a solid-liquid PCM, such as a crystal mixture of Sodium Chloride and Sodium Hydroxide salts with phase change temperature at 385° C. and thermal storage density at 370 kJ/kg, can be used to store the thermal energy at 385° C. during the day and release the thermal energy during the evening. This stored thermal energy is able to generate water steam at 360° C. with pressure of 18.5 MPa pressure. If one wants to use two container molten salt thermal storage system to achieve the same effect, the amount of thermal storage material used has to be 15 to 20 time more than the solid-liquid PCM thermal storage material. The closer the generated steam's temperature to the upper temperature limit (400° C., in this case), the more advantage of PCM against the sensible-heat thermal storage solution.

FIG. 9 illustrates an exemplary implementation of a solid-liquid PCM package, which can be used in above mentioned thermal storage container. For solid-liquid phase change thermal storage materials, specially designed metal containers 926 may be used to contain PCMs 960. This container 926 is made with elastic metal shell so that when solid phase material changes to liquid phase materials, or vise versa, adapts volume changes during phase change process. Grooves 961 are made on container shell can accommodate the volume changes during phase transitions. Such structure arrangement is used to replace solid sensible-heat storage materials in the thermal energy storage container.

Figure 10:
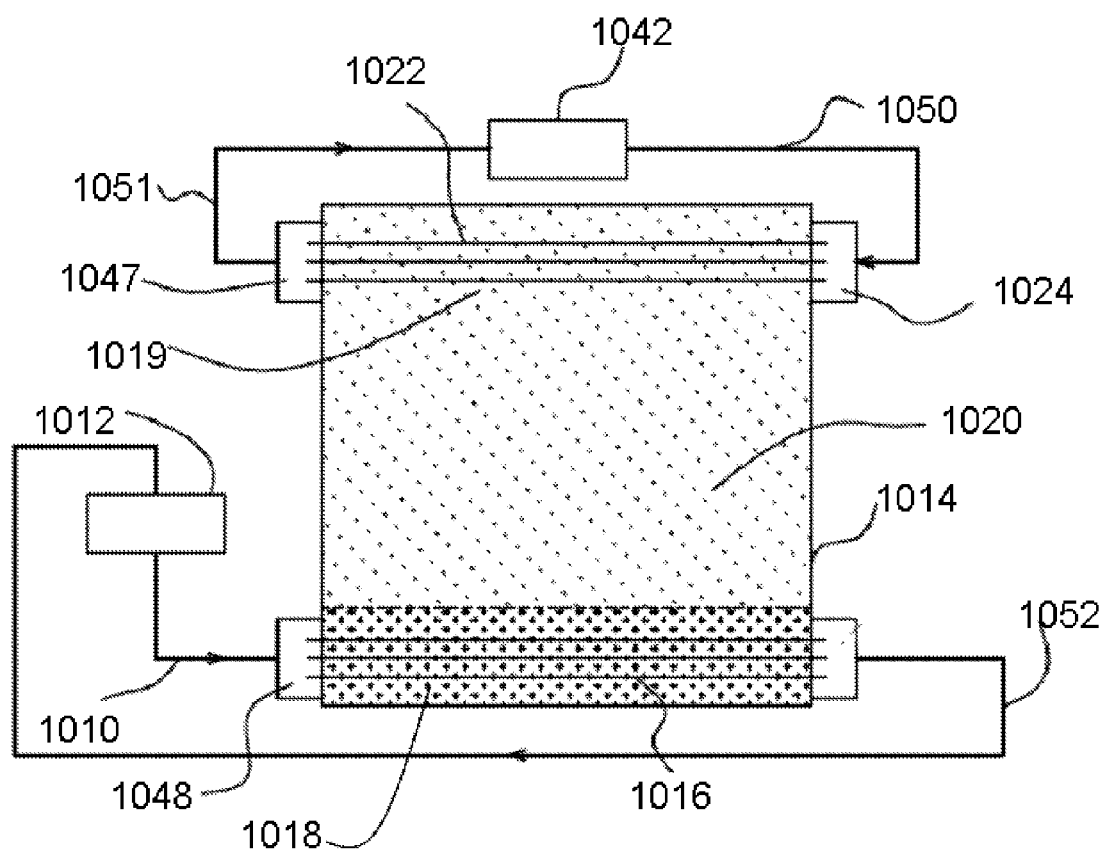
FIG. 10 is block diagram illustrating an exemplary system without any thermal storage media consistent with certain aspects related to the innovations herein.

FIG. 10 is block diagram illustrating an exemplary system and chamber 1014 without any thermal storage media consistent with certain aspects related to the innovations herein. Referring to FIG. 10, the heat input and heat transfer fluid system 1010/1018/1016/1048/1052/1012 and the heat output and working fluid system 1047/1051/1042/1050/1024/1022 are implemented to transfer heat via vapor 1020 and liquid 1018 forms of a HTF in manners consistent with similar systems in the embodiments set forth above, without any operation or involvement of heat storage media.

Figure 11:
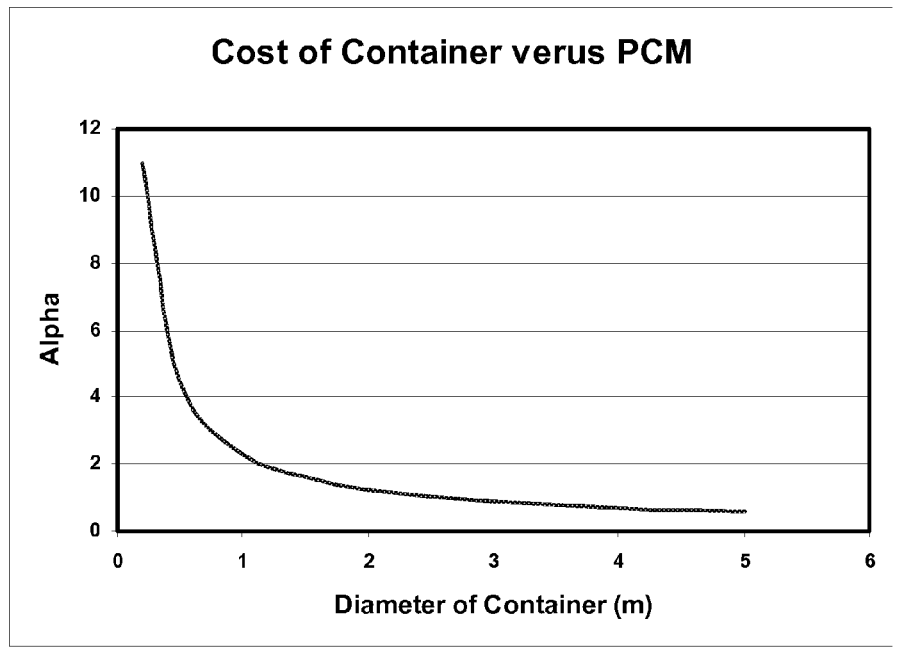
FIG. 11 is a graph illustrating an exemplary relationship between a ratio of pressurized container material cost/price versus PCM cost/Price and the radius of the thermal storage container, consistent with certain aspects related to the innovations herein.

FIG. 11 is a graph illustrating an exemplary relationship between a ratio of pressurized container material cost/price versus PCM cost/price against the radius of thermal storage container, consistent with certain aspects related to the innovations herein. Further details of the innovations and relationships embodying features consistent with this graph are set forth elsewhere herein.

FIG. 12 illustrates a block diagram of an exemplary heat transfer/storage system in accordance with one or more implementations of the innovations herein. Referring to FIG. 12, the heat transfer/storage system may comprise a transfer/storage field 120 including transfer/storage apparatus 100 and a controller 170 and, optionally, one or more elements of external systems 130. The controller may include one or more computing components, systems and/or environments 180 that perform, facilitate or coordinate control of heat storage/transfer. As explained in more detail below, such computing elements may take the form of one or more local computing structures that embody and perform a full implementation of the features and functionality herein or these elements may be distributed with one or more controller(s) 170 serving to coordinate the distributed processing functionality. Further, the controller 170 is not necessarily in close physical proximity to the collectors 100, though is shown in the drawings as being associated with the transfer/storage site 120. The system may also include one or more optional external devices or systems 130, which may embody the relevant computing components, systems and/or environments 180 or may simply contain elements of the computing environment that work together with other computing components in distributed arrangements to realize the functionality, methods and/or innovations herein.

With regard to computing components and software embodying the inventions herein, such as the heat transfer and/or storage methods, the innovations herein may be implemented/operated consistent with numerous general purpose or special purpose computing system environments or configurations. Various exemplary computing systems, environments, and/or configurations that may be suitable for use with the innovations herein may include, but are not limited to, personal computers, servers or server computing devices such as routing/connectivity components, hand-held or laptop devices, multiprocessor systems, microprocessor-based systems, set top boxes, smart phones, consumer electronic devices, network PCs, other existing computer platforms, distributed computing environments that include one or more of the above systems or devices, etc.

The invention may be described in the general context of computer-executable instructions, such as program modules, being executed by a computer, computing component, etc. In general, program modules may include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Computing component/environment 180 may also include one or more type of computer readable media. Computer readable media can be any available media that is resident on, associable with, or can be accessed by computing component/environment 180. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing components. Communication media may comprise computer readable instructions, data structures, program modules or other data embodying the functionality herein. Further, communication media may include wired media such as a wired network or direct-wired connection, and wireless media such as acoustic, RF, infrared and other wireless media. Combinations of the any of the above are also included within the scope of computer readable media.

In the present description, the terms component, module, device, etc. may refer to any type of logical or functional process or blocks that may be implemented in a variety of ways. For example, the functions of various blocks can be combined with one another into any other number of modules. Each module can be implemented as a software program stored on a tangible memory (e.g., random access memory, read only memory, CD-ROM memory, hard disk drive) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, implementations and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe components such as software, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

FIG. 13 illustrates an exemplary implementation of thermal storage container's geometric configurations with PCM filled inside of secondary cylindrical pipes, consistent with certain aspects related to the innovations herein. Referring to FIG. 13, an exemplary system with PCM filled within a secondary cylindrical pipe is shown, wherein the pipe may be 5 cm, about 5 cm, or other diameter. For example, according to the heat transfer implementations/innovations based on the nature of PCM, such as discussed above with NaOH (73.2%)+NaCl (26.8%) mixture with latent heat of 370 kJ/kg: here, if this PCM mixture is packaged into a 5 cm diameter pipe, then, within 5 hours, more than 80% in the pipe will be melted when VP-1 vapor temperature is 10 degree higher than its melting point, 369° C.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain exemplary implementations of the present innovations have been specifically described herein, it will be apparent to those skilled in the art to which the invention pertains that variations and modifications of the various implementations shown and described herein may be made without departing from the spirit and scope of innovations consistent with this disclosure. Accordingly, it is intended that the innovations be limited only to the extent required by the appended claims and the applicable rules of law.

TABLE 1

Heat transfer, working fluid, and heat exchange media

| ITEM | COMPONENT | MOLE WT | BOILING POINT K (TB) | HEAT VAPOR NORMAL BP CAL/G-MOLE |
|---|---|---|---|---|
| THE LOW-BOILING SUBSTANCES | CHLOROFORM | 119.378 | 334.3 | 7100 |
| | METHANOL | 32.042 | 337.8 | 8426 |
| | ACETYL CHLORIDE | 78.498 | 323.9 | 6850 |
| | CYCLOPENTANE | 70.080 | 322.3 | 6536 |
| | PROPIONALDEHYDE | 58.080 | 321.0 | 6760 |
| | N-PROPYLAMINE | 59.112 | 321.8 | 7100 |
| | 2,3-DIMETHYL-1-BUTENE | 84.162 | 328.8 | 6550 |
| THE MID-BOILING SUBSTANCES | O-ETHYLPHENOL | 122.167 | 477.7 | 11490 |
| | ETHYL BENZOATE | 150.178 | 485.9 | 10700 |
| | 1,2,3,4-TETRAHYDRONAPHTHALENE | 132.206 | 480.7 | 9490 |
| | N-HEXYLCYCLOPENTANE | 154.297 | 476.3 | 9840 |
| | 1-DODECENE | 168.324 | 486.5 | 10270 |
| | VP-1 HEAT TRANSFER OIL | 166.000 | 530.0 | 11171 |
| THE HIGH-BOILING SUBSTANCES | N-OCTADECANE | 254.502 | 589.5 | 13020 |
| | N-PENTADECYLCYCLOPENTANE | 280.540 | 625.0 | 13780 |
| | 1-EICOSANOL | 298.555 | 629.0 | 15600 |

TABLE 2

Low Temperature PCMs

|  | Compound | $T_m$, ° C. | $\Delta H_f$, KJ/Kg | Density, (Kg/m³) | Thermal conductivity (W/(mK)) |
|---|---|---|---|---|---|
| abio-hydrous salt | LiNO3*3H2O | 30 | 296 | | |
| | Na2SO4*10H2O | 32.4 | 254 | 1485 | 0.544 |
| | Na2CO3*10H2O | 33 | 247 | 1349 (liguid, 84° C.) 1447 (solid, 24° C.) | |
| | Na2HPO4*10H2O | 36 | 281 | 1522 | |
| | Na2S2O3*5H2O | 48 | 209.3 | 1600 | |
| | Na(CH3COO)*3H2O | 58 | 226 | 1450 | |
| | Na2P2O4*10H2O | 70 | 184 | | |
| | 50%Na(CH3COO)*3H2O + 50%HCO NH2 | 40.5 | 255 | | |
| | Ba(OH)2i*8H2O | 78 | 280 | 1937 (liquid, 84° C.) 2070 (solid, 24° C.) | 0.678 (98.2° C.) 1.225 (23° C.) |
| paraffin | C16~C28 | 42~44 | 189 | 765 (liquid, 70° C.) 910 (solid, 20° C.) | 0.21 |
| | C20~C33 | 48~50 | 189 | 769 (liquid, 70° C.) 912 (solid, 20° C.) | 0.21 |
| | C20~C45 | 58~60 | 189 | 795 (liquid, 70° C.) 920 (solid, 20° C.) | 0.21 |
| | C21~C50 | 66~68 | 189 | 830 (liquid, 70° C.) 930 (solid, 20° C.) | |
| | sliceable paraffin | 64 | 173.6/266 | 790 (liquid, 65° C.) 916 (solid, 24° C.) | 0.167 (63.5° C.) 0.346 (33.6° C.) |
| fatty acid | lauric acid | 42~44 | 177.4/178 | 862 (liquid, 60° C.) 1007 (solid, 24° C.) | 0.147 |
| | tetradecanoic acid | 49~51 | 187 | 861 (liquid, 55° C.) 990 (solid, 24° C.) | |
| | cetylic acid | 63 | 187 | 850 (liquid, 65° C.) 989 (solid, 24° C.) | 0.162 |
| | stearic acid | 70 | 203 | 848 (liquid, 70° C.) 965 (solid, 24° C.) | |
| products in used | ClimSel C32 (hydrous salt) | 32 | 212 | 1450 | |
| | RT40 (paraffin state) | 43 | 181 | | |
| | STL47 (hydrous salt) | 47 | 221 | 1340 | |
| | ClimSel C48 (hydrous salt) | 48 | 227 | 1360 | |
| | STL52 (hydrous salt) | 52 | 201 | 1300 | |
| | RT50 (paraffin state) | 54 | 195 | 1290 | |
| | STL55 (hydrous salt) | 55 | 242 | | |
| | TH58 (hydrous salt) | 58 | 226 | | |
| | ClimSel C48 (hydrous salt) | 58 | 259 | 1460 | |
| | RT65 (paraffin state) | 64 | 207 | | |

TABLE 3

High Temperature PCMs

| substance 1 | (mol %) | substance 2 | (mol %) | substance 3 | (mol %) | melting point ° C. | $\Delta H_f$, kwh/t |
|---|---|---|---|---|---|---|---|
| MnCl2 | 37.3 | NaCl | 25 | KCl | 37.7 | 400 | 65.3 |
| LiCO3 | 32 | K2CO3 | 35 | NaCO3 | 33 | 397 | 76.7 |
| MgCl2 | 50 | KCl | 20 | NaCl | 30 | 396 | 80.8 |
| MgCl2 | 51 | KCl | 22 | NaCl | 27 | 396 | 80.6 |
| KCl | 45.5 | MnCl2 | 34.5 | NaCl | 20 | 390 | 63.9 |
| MgCl2 | 63.7 | NaCl | 22.3 | KCl | 14 | 385 | 128.1 |
| KOH | | | | | | 380 | 41.6 |
| NaOH | 73.2 | NaCl | 26.8 | | | 369 | 102.5 |
| KCl | 28.7 | MnCl2 | 45 | NaCl | 26.3 | 350 | 59.7 |
| KCl | 0.61 | FeCl2 | 0.39 | | | 345 | |
| KNO3 | | | | | | 335 | 24.44 |
| NaOH | 77.2 | NaCl | 16.2 | Na2CO3 | 6.6 | 318 | 80.6 |
| NaOH | | | | | | 318 | 44.17 |
| KNO3 | 0.905 | KCl | 0.095 | | | 308 | 47.2 |
| NaNO3 | 0.98 | Na2CO3 | 0.02 | | | 307 | |
| NaNO3 | | | | | | 307 | 49.17 |
| NaNO3 | 0.965 | NaF | 0.035 | | | 303 | |
| NaCl | 0.066 | NaNO3 | 0.934 | | | 298 | 58.9 |
| NaOH | 85.8 | NaCl | 7.8 | Na2CO3 | 6.4 | 298 | 79.4 |
| NaCl | 0.066 | NaNO3 | 0.934 | | | 298 | |
| NaNO3 | 0.95 | Na2SO4 | 0.05 | | | 296 | |
| NaNO3 | 0.95 | Na2SO4 | 0.05 | | | 296 | |

TABLE 3-continued

High Temperature PCMs

| substance 1 | (mol %) | substance 2 | (mol %) | substance 3 | (mol %) | melting point ° C. | $\Delta H_p$, kwh/t |
|---|---|---|---|---|---|---|---|
| NaOH | 0.94 | Na2SO4 | 0.06 | | | 294 | |
| NaOH | 87.3 | NaCl | 6.1 | Na2CO3 | 6.6 | 291 | 78.6 |
| NaCl | 8 | NaF | 5 | NaNO3 | 87 | 288 | 62.2 |
| NaNO3 | 86.3 | NaCl | 8.4 | Na2SO4 | 5.3 | 287 | 49.17 |
| Na2CO3 | 0.08 | NaOH | 0.92 | | | 286 | 94.4 |
| NaOH | 88.3 | NaCl | 5.3 | Na2CO3 | 6.4 | 282 | 77.5 |
| NaNO3 | 0.41 | NaOH | 0.59 | | | 266 | 77.2 |
| KCl | 0.28 | ZnCl2 | 0.72 | | | 264 | |
| NaNO3 | 0.194 | NaOH | 0.806 | | | 258 | 69.7~81.1 |
| NaNO3 | 0.615 | NaOH | 0.285 | | | 250 | 43.89 |
| NaNO3 | 0.615 | NaOH | 0.285 | | | 250 | 158 |
| NaOH | 55.6 | NaCl | 4.2 | NaNO3 | 40.2 | 247 | 59.2 |
| NaNO3 | 18.3 | NaCl | 3.6 | NaOH | 78.1 | 242 | 67.2 |
| NaOH | 30 | NaNO3 | 70 | | | 247 | 43.9 |
| NaOH | 28 | NaNO3 | 72 | | | 246~247 | 50.6~71.4 |

The invention claimed is:

1. A system comprising:
a heat exchange/storage apparatus including:
a chamber;
a heat input device that contains and introduces a heat transfer fluid HTF into the chamber where a surface of said input device in said chamber is in contact with a liquid-gas phase change heat exchange material disposed in a lower portion of said chamber;
a thermal storage medium disposed within said chamber and having defined thermal storage surfaces where the thermal storage medium includes a solid-to-liquid phase change material (PCM) contained within a plurality of secondary containers wherein the PCM has a transition temperature within a temperature range such that the liquid-gas heat exchange material in vapor form external to said secondary containers condenses into liquid upon contact with said secondary containers to release latent heat into said solid-to-liquid phase change material;
a heat output device associated with the chamber, wherein the heat output device contains a working fluid (WF) and includes heat output device surfaces within an upper portion of the chamber;
a circulation plumbing system disposed to
during a charging cycle, deliver a vapor form of said heat transfer fluid HTF into said input device, and transfer heat from said input device into a liquid form of said heat exchange material converting said heat exchange material from a liquid to a vapor which condenses on the plurality of secondary containers and transfers heat into said thermal storage medium and in doing so converts back into a liquid form; and
during a discharging cycle, pass a liquid form of said heat exchange material from the lower portion of said chamber outside said chamber and then back into an upper portion of said chamber and via a showerhead or dripping device to deliver said liquid heat exchange material to a surface of said thermal storage medium to convert said heat exchange material to a vapor that rises in said chamber and contacts and condenses on a surface of said heat output device transferring heat to said working fluid in said heat output device, and then falling back down in said chamber to be heated again by said phase change material or cycled again outside said chamber; and
a control system that controls pressure in the chamber.

2. The system of claim 1 wherein the heat input device includes heat input device surfaces that pass through and are exposed within the chamber.

3. The system of claim 1 wherein the heat input device surfaces are immersed within a liquid form of said heat exchange medium that transforms to vapor form upon receipt of the latent heat from the HIT in said heat input device.

4. The system of claim 3 wherein the heat input device surfaces comprise tubing.

5. The system of claim 1, wherein said heat output device is configured to transfer heat from a vapor form of said liquid-gas heat exchange material to said working fluid.

6. The system of claim 1, wherein heat charging and discharging of the thermal storage device from the heat input device and to the heat output device, respectively, is provided via time sequence control of condensation temperature and heat transfer rate via regulation of chamber pressure.

7. The system of claim 1, wherein
said heat input device has an input entry for residual/exhaust heat vapor from a heat appliance and an outlet that returns the liquid condensate of said exhaust vapor to the heat appliance;
said a heat output device is in thermal communication with a thermal environment to which heat can be transferred; and
said control system controls pressure and heat transfer between the vapor, the thermal storage device and/or the heat output device.

8. The system of claim 7 wherein the system is configured to release the latent heat within the chamber at a desired temperature via pressure regulated by the control system.

9. The system of claim 1 wherein the chamber includes thermal insulation, and/or wherein the heat exchange/storage apparatus is configured to store the heat within the thermal storage material over an extended timeframe, for later use via exchange to the heat output device.

10. The system of claim 1 wherein the heat output device includes an entry and an outlet to circulate a working medium into contact with heat output device surfaces within the chamber, and wherein the heat output device is configured such that the latent heat is delivered to the working fluid via condensation of a vapor form of said heat exchange material on the heat output device surfaces.

11. The system of claim 1 wherein the heat exchange/storage apparatus is configured to transfer latent heat from a vapor form of said heat exchange medium produced by heat transfer from said storage medium to a liquid form of said heat exchange material to the working fluid by condensation of said heat exchange medium on the heat output device heat surfaces.

12. The system of claim 1 wherein the heat input device includes heat input device surfaces, tubing, or pipes that pass through and are exposed within the chamber.

13. The system of claim 12 wherein the heat input device surfaces are immersed within said heat exchange medium that transforms to vapor form upon receipt of the latent heat from said heat transfer fluid in said heat input device.

14. The system of claim 1 wherein the control system includes an evacuation system and inert gas pressure regulator coupled to the chamber to control pressure in the chamber.

15. The system of claim 1 wherein the condensation temperature of said heat exchange material is within a range of the thermal storage materials' phase transition temperature at a controlled chamber pressure.

16. The system of claim 1 wherein the control system controls heat transfer rates and/or temperatures between one or more of the heat input device, the thermal storage material, and/or the heat output device.

17. The system of claim 1 wherein the control system controls the temperature in the chamber using an evacuation system and an inert gas pressure regulator in conjunction with flow rate control to maintain a chamber vapor pressure and a chamber temperature for a target liquid phase volume for constant heat exchange.

18. The system of claim 1 wherein the control system controls the pressure of the chamber to cause the exhaust vapor to condense instantly at a desired temperature range and thereby transfer its latent heat to the thermal storage material.

19. The system of claim 1 wherein the control system controls the condensation temperature of the heat exchange material to be higher than the transition temperature of the thermal storage material, causing a vapor form of the heat exchange material to condense and transfer its latent heat to the thermal storage material.

20. The system of claim 1 wherein the control system controls the condensation temperature of the heat exchange material to be lower than the transition temperature of the thermal storage material, causing the heat exchange medium vapor to condense on surfaces of the heat output device and thereby transfer latent heat from the heat storage material to the working medium.

21. The system of claim 1 further comprising a circulation pump in heat exchange fluid communication with the bottom of the chamber, configured to circulate heat exchange material condensed at the bottom of the chamber.

22. The system of claim 1 wherein the control system regulates a pressure to control a temperature and heat transfer rate between the heat input device, the thermal storage material, and the heat output device in time sequence.

23. The system of claim 1, wherein the PCM material includes a low temperature phase change material having a melting point below about 100° C.

24. The system of claim 1, wherein the PCM material comprises an organic material.

25. The system of claim 1, wherein the PCM material includes a medium temperature phase change material having a melting point between about 100° C. and about 200° C.

26. The system of claim 1, wherein the PCM material includes a high temperature phase change material having a melting point above about 200° C.

27. A method of exchanging/storing heat, comprising:
obtaining a vapor form of a heat transfer fluid (HTF) from the heat output of a heat source or solar collector;
introducing said HTF into the heat input device of a system according to any one of claims 1-3, 4, 5, 6-8, 9, 10, 11, 12, 13, 14-22, 23, 24, 25, and 26; and
operating said system to store heat from said HTF and return a liquid form of said heat transfer fluid; and/or
operating said system to return heat to said working fluid.

28. The method of claim 27 wherein the step of obtaining a vapor further comprises:
receiving waste heat from a heat appliance, wherein the waste heat comprises a low temperature vapor at less than 100° C. and at less than 1 atmosphere; and
transferring the waste latent heat into the latent heat of solid-liquid latent of PCM storage material.

29. The method of claim 27, wherein said method comprises:
discharging latent heat from the thermal storage material by evaporating said heat exchange medium and condensing said heat exchange medium on a surface of said heat output device.

30. The method of claim 27 wherein the storing/charging of latent heat into the thermal storage material is performed sequentially into a series of heat storage chambers, each having its own respective thermal storage material.

* * * * *